US012587765B2

(12) United States Patent
Hasegawa et al.

(10) Patent No.: US 12,587,765 B2
(45) Date of Patent: Mar. 24, 2026

(54) IMAGING DEVICE AND ELECTRONIC APPARATUS COMPRISING IMAGING DEVICE

(71) Applicant: Sony Semiconductor Solutions Corporation, Kanagawa (JP)

(72) Inventors: Masako Hasegawa, Kanagawa (JP); Takashi Moue, Kanagawa (JP); Youhei Oosako, Kanagawa (JP); Tomonori Yamashita, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 158 days.

(21) Appl. No.: 18/293,862

(22) PCT Filed: Mar. 24, 2022

(86) PCT No.: PCT/JP2022/013944
§ 371 (c)(1),
(2) Date: Jan. 31, 2024

(87) PCT Pub. No.: WO2023/047661
PCT Pub. Date: Mar. 30, 2023

(65) Prior Publication Data
US 2024/0348947 A1    Oct. 17, 2024

(30) Foreign Application Priority Data
Sep. 21, 2021    (JP) ................................. 2021-153421

(51) Int. Cl.
H04N 25/772        (2023.01)
(52) U.S. Cl.
CPC ................................ H04N 25/772 (2023.01)

(58) Field of Classification Search
CPC .. H04N 25/772; H04N 25/532; H04N 25/587; H04N 25/709; H04N 25/771; H04N 25/79; H04N 25/77
See application file for complete search history.

(56) References Cited

U.S. PATENT DOCUMENTS

| | | |
|---|---|---|
| 2005/0151060 A1 | 7/2005 | Hashiguchi |
| 2006/0170795 A1 | 8/2006 | Higuchi |

(Continued)

FOREIGN PATENT DOCUMENTS

| | | |
|---|---|---|
| JP | 2014096669 A | 5/2014 |
| TW | 202042544 A | 11/2020 |

(Continued)

OTHER PUBLICATIONS

International Search Report (PCT/ISA/210), International Application No. PCT/JP2022/013944, dated May 24, 2022.

(Continued)

*Primary Examiner* — Albert H Cutler
(74) *Attorney, Agent, or Firm* — Michael Best & Friedrich LLP

(57) ABSTRACT

[Problem] An imaging device that can increase the dynamic range of pixel signals is provided.
[Means of Solution] An imaging device according to an embodiment of the present disclosure includes: a plurality of pixels that are exposed during a same period; and an AD converter that digitizes an analog pixel signal output from each of the plurality of pixels. Further, each of the plurality of pixels includes a photoelectric conversion circuit that photoelectrically converts incident light, a first source follower circuit that amplifies an output signal of the photoelectric conversion circuit, a signal holding circuit that holds an output signal of the first source follower circuit, and a second source follower circuit that amplifies a signal read out from the signal holding circuit and outputs the signal as (Continued)

the pixel signal. Furthermore, a ramp signal including a slope portion in which a voltage level changes like a ramp is supplied to the signal holding circuit.

19 Claims, 26 Drawing Sheets

(56) References Cited

U.S. PATENT DOCUMENTS

| | | | |
|---|---|---|---|
| 2011/0249162 A1 | 10/2011 | Moore | |
| 2014/0118592 A1* | 5/2014 | Yoon | H04N 25/47 |
| | | | 348/308 |
| 2015/0009379 A1* | 1/2015 | Yan | H04N 25/772 |
| | | | 257/225 |
| 2017/0180660 A1 | 6/2017 | Xu | |
| 2017/0214869 A1 | 7/2017 | Ladd | |
| 2020/0053308 A1 | 2/2020 | Niwa | |
| 2022/0014702 A1* | 1/2022 | Yin | H04N 25/77 |
| 2022/0094864 A1* | 3/2022 | Lee | H04N 25/78 |
| 2022/0337774 A1* | 10/2022 | Oh | H04N 25/59 |

FOREIGN PATENT DOCUMENTS

| | | |
|---|---|---|
| TW | 202116059 A | 4/2021 |
| WO | 2019150917 A1 | 8/2019 |

OTHER PUBLICATIONS

J-K.Lee et al. "A 2.1e– Temporal Noise and –105dB Parasitic Light Sensitivity Backside-Illuminated 2.3um-Pixel Voltage-Domain Global Shutter CMOS Image Sensor Using High-Capacity DRAM Capacitor Technology," ISSCC 2020 / Session 5 / Imagers and Tof Sensors / 5.5, pp. 102-104.

* cited by examiner

301

302

303

IMAGING DEVICE AND ELECTRONIC APPARATUS COMPRISING IMAGING DEVICE

TECHNICAL FIELD

The present disclosure relates to an imaging device and an electronic apparatus.

BACKGROUND ART

Some imaging devices employ a rolling shutter method in which signals generated by a plurality of pixels photoelectrically converting incident light, respectively, are sequentially read out for each pixel row. In an imaging device employing the rolling shutter method, the exposure timing of each pixel is different in each pixel row. Accordingly, for an object to be imaged being a dynamic subject, the subject will be distorted in the image.

Therefore, in order to eliminate the distortion of the subject, an imaging device employing a global shutter method has been proposed in which all pixels are exposed simultaneously. In a typical imaging device employing the global shutter method, all pixels are exposed simultaneously, and then signals generated by photoelectric conversion are temporarily held. The signals held are sequentially converted into analog pixel signals and read out at predetermined timings.

An analog pixel signal read out is digitized by an AD converter. For example, the AD converter compares the analog pixel signal with a ramp signal with a triangular wave. The output voltage of the AD converter is inverted at the timing when the voltage of the pixel signal matches the voltage of the ramp signal.

CITATION LIST

Non Patent Literature

[NPL 1] J-K. Lee, A 2.1e– Temporal Noise and –105 dB Parasitic Light Sensitivity Backside—Illuminated 2.3 um—Pixel Voltage—Domain Global Shutter CMOS Image Sensor Using High-Capacity DRAM Capacitor Technology, ISSCC2020

SUMMARY

Technical Problem

The voltage level of a pixel signal input to the AD converter changes depending on the intensity of incident light, that is, the amount of charge for photoelectric conversion. When the AD converter compares an analog pixel signal with a ramp signal with a triangular wave, the inversion voltage of the AD converter also changes depending on the voltage level of the pixel signal.

However, the range of inversion voltage that is allowed in the AD converter is limited, and accordingly, the range of change in the voltage level of the pixel signal, that is, the dynamic range of the pixel signal is also limited.

Therefore, the present disclosure provides an imaging device and an electronic apparatus that can increase the dynamic range of pixel signals.

Solution to Problem

An imaging device according to an embodiment of the present disclosure includes: a plurality of pixels that are exposed during a same period; and an AD converter that digitizes an analog pixel signal output from each of the plurality of pixels. Further, each of the plurality of pixels includes a photoelectric conversion circuit that photoelectrically converts incident light, a first source follower circuit that amplifies an output signal of the photoelectric conversion circuit, a signal holding circuit that holds an output signal of the first source follower circuit, and a second source follower circuit that amplifies a signal read out from the signal holding circuit and outputs the signal as the pixel signal. Furthermore, a ramp signal including a slope portion in which a voltage level changes like a ramp is supplied to the signal holding circuit.

The imaging device may further include a signal generation circuit that generates the ramp signal and supplies the ramp signal to the signal holding circuit.

The signal holding circuit may include a first capacitive element that holds a first signal that has reset the photoelectric conversion circuit, and a second capacitive element that holds a second signal generated by photoelectric conversion of the photoelectric conversion circuit, and the signal generation circuit may supply the ramp signal to each of the first capacitive element and the second capacitive element.

The signal holding circuit may further include a first sample transistor that is connected in series to the first capacitive element, and a second sample transistor that is connected in series to the second capacitive element, and when the first sample transistor is in an on state, the first signal may be held in the first capacitive element, and when the second sample transistor is in an on state at a timing different from that of the first sample transistor, the second signal may be held in the second capacitive element.

The second source follower circuit may read out the first signal from the signal holding circuit before reading out the second signal.

The second source follower circuit may read out the second signal from the signal holding circuit before reading out the first signal.

The signal holding circuit may further include a switch that is disposed between the signal generation circuit and an input node to which one end of the first capacitive element and one end of the second capacitive element are commonly connected, and the switch may be in an on state during a period in which the second source follower circuit reads out a signal held in the signal holding circuit.

The imaging device may further include a current source that is shared by the second source follower circuit and the AD converter.

The signal holding circuit may further include a reset transistor that resets a potential of the input node.

The first source follower circuit may include an amplifier transistor that amplifies the output signal of the photoelectric conversion circuit, a selection transistor that is connected in series to the amplifier transistor, a bias cut switch that is connected in series to the selection transistor, and a current source that is connected in series to the bias cut switch, and the bias cut switch may be in an off state from an end of a period in which the plurality of pixels are exposed to just before a start of a period in which the second source follower circuit reads out a signal held in the signal holding circuit.

The bias cut switch may be in an off state also during a period in which the second source follower circuit reads out a signal held in the signal holding circuit.

3

The first source follower circuit may further include a switch that is disposed between the selection transistor and the signal holding circuit, and the switch may be controlled independently from the selection transistor.

The imaging device may further include a third source follower circuit that amplifies the ramp signal and supplies the resulting ramp signal to the signal holding circuit.

The third source follower circuit may include an amplifier transistor that amplifies the ramp signal, and a selection transistor that is disposed between the amplifier transistor and the signal holding circuit, and the selection transistor may be in an on state during a period in which the second source follower circuit reads out a signal held in the signal holding circuit.

The ramp signal may include the slope portion and an offset portion in which the voltage level changes like a rectangular wave.

The slope portion may be supplied to the signal holding circuit, and the offset portion may be supplied to the AD converter.

The AD converter may include an input transistor and an output transistor provided at a stage subsequent to the input transistor, the offset portion may be input to a gate of the input transistor, the pixel signal is input to a source of the input transistor, and a drain of the input transistor may be connected to a gate of the output transistor, and the pixel signal may be input to a source of the output transistor.

The photoelectric conversion circuit, the first source follower circuit, and the switch may be arranged on a first substrate, and remaining elements of the signal holding circuit other than the switch, and the second source follower circuit may be arranged on a second substrate stacked on the first substrate.

Some elements of the photoelectric conversion circuit may be arranged on a first substrate, remaining elements of the photoelectric conversion circuit, the first source follower circuit, and the switch may be arranged on a second substrate stacked on the first substrate, and remaining elements of the signal holding circuit other than the switch, and the second source follower circuit may be arranged on a third substrate stacked on the first substrate and the second substrate.

An electronic apparatus according to an embodiment of the present disclosure includes an imaging device that includes: a plurality of pixels that are exposed during a same period; and an AD converter that digitizes an analog pixel signal output from each of the plurality of pixels. In this imaging device, each of the plurality of pixels includes a photoelectric conversion circuit that photoelectrically converts incident light, a first source follower circuit that amplifies an output signal of the photoelectric conversion circuit, a signal holding circuit that holds an output signal of the first source follower circuit, and a second source follower circuit that amplifies a signal read out from the signal holding circuit and outputs the signal as the pixel signal. Further, a ramp signal including a slope portion in which a voltage level changes like a ramp is supplied to the signal holding circuit.

4

Figure 2:
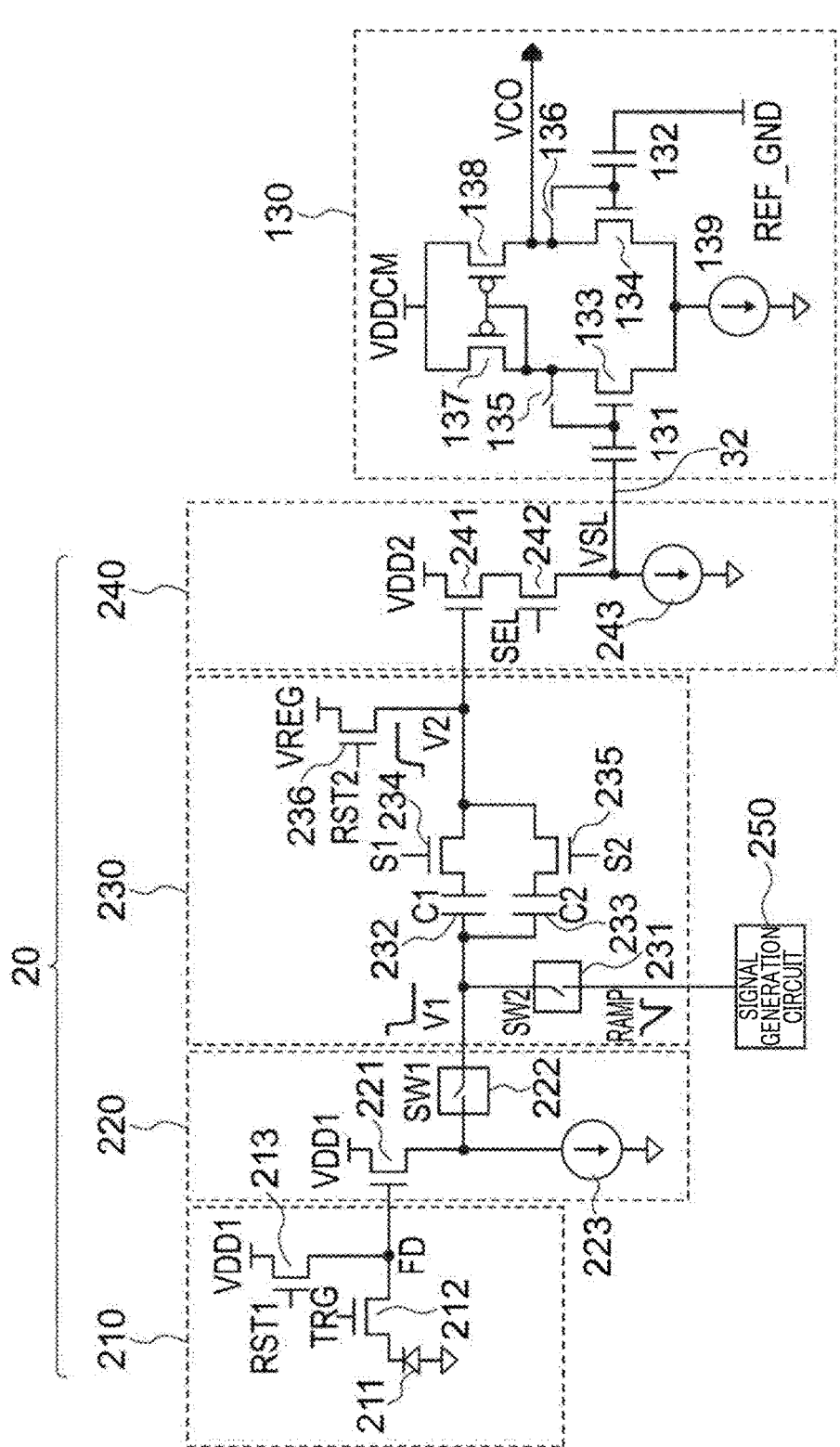

FIG. 2 is a diagram illustrating a circuit configuration of a pixel and an AD converter according to the first embodiment.

Figure 3A:
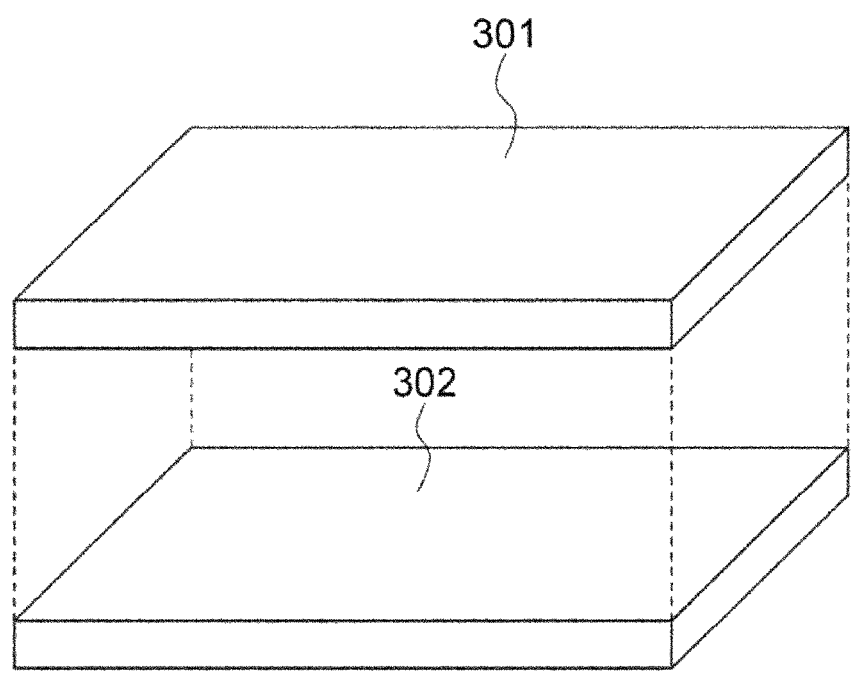

FIG. 3A is a perspective view illustrating an example of a two-layer structure of a pixel.

Figure 3B:
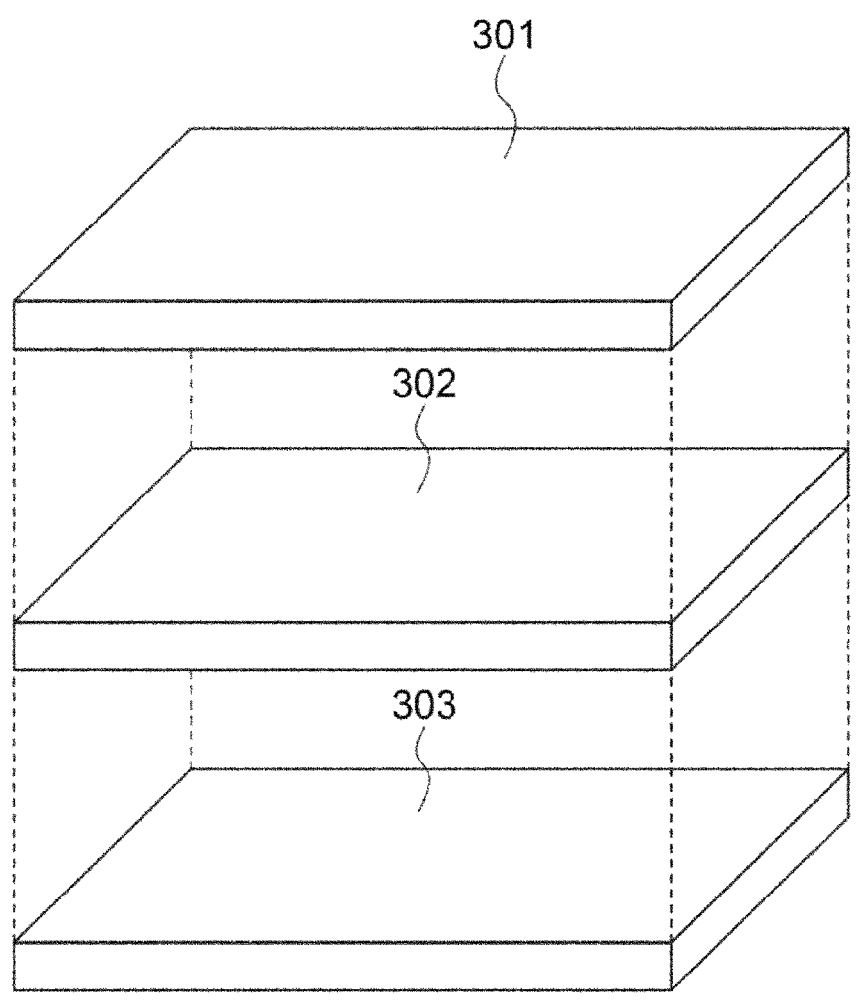

FIG. 3B is a perspective view illustrating an example of a three-layer structure of a pixel.

Figure 4:
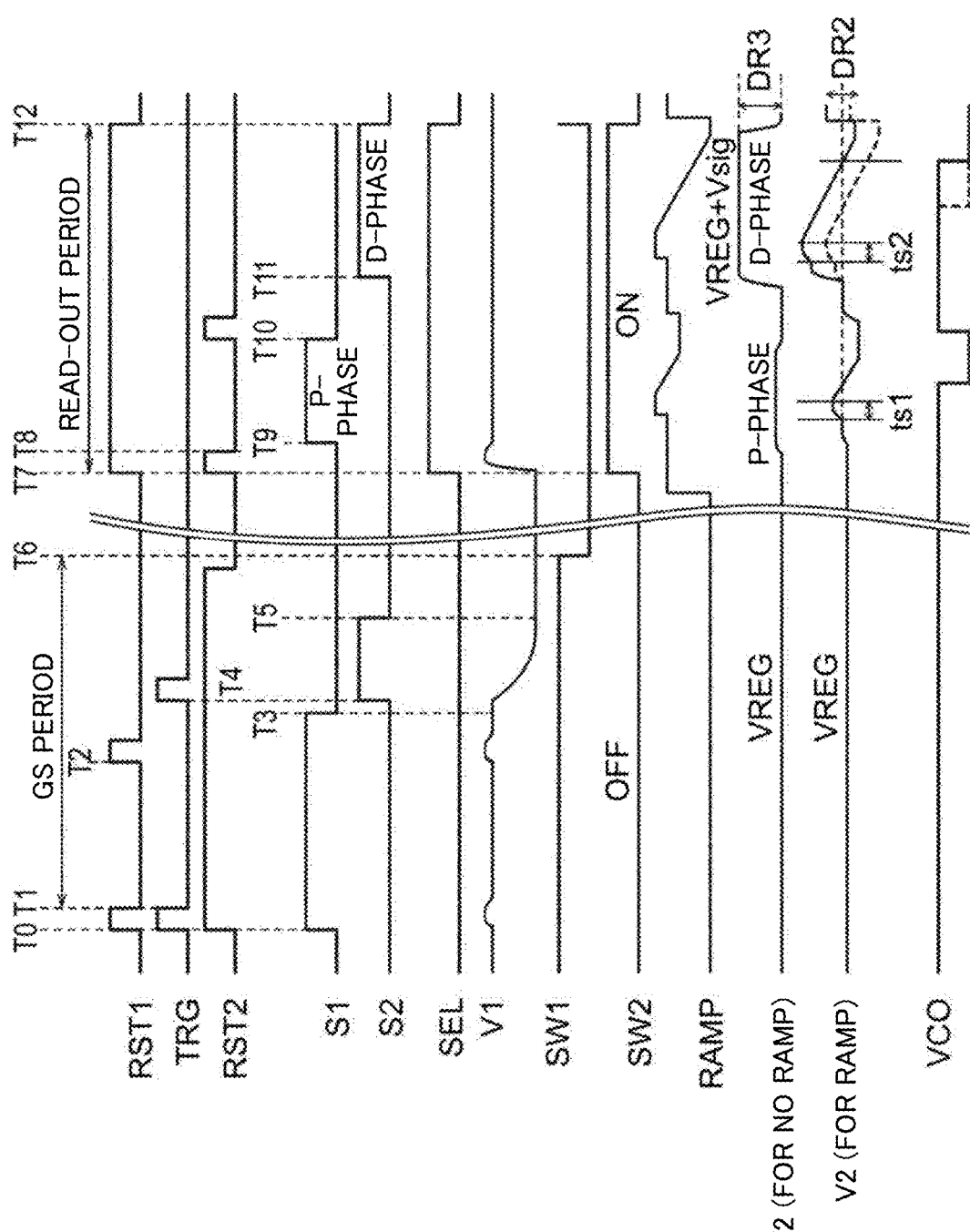

FIG. 4 is a timing chart for explaining the operation of the pixel according to the first embodiment.

Figure 5A:
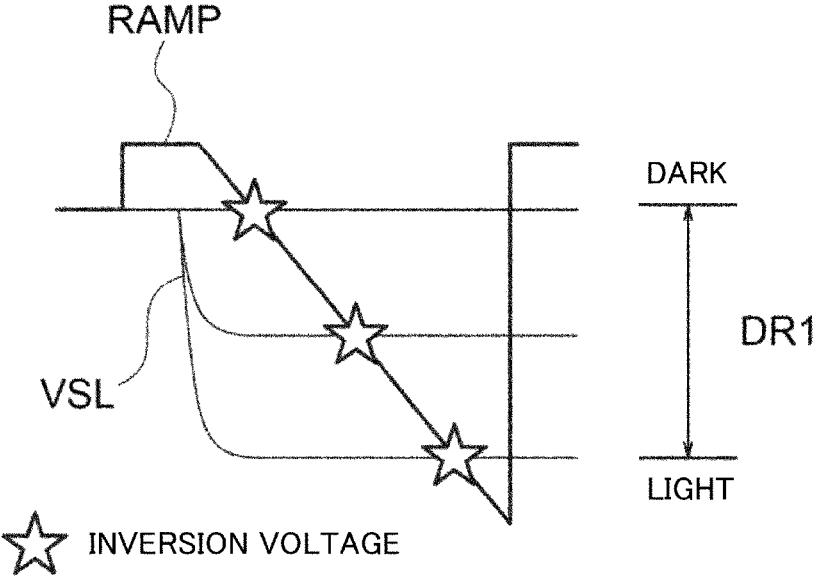

FIG. 5A is a voltage waveform diagram illustrating an inversion voltage of an AD converter according to a comparative example.

Figure 5B:
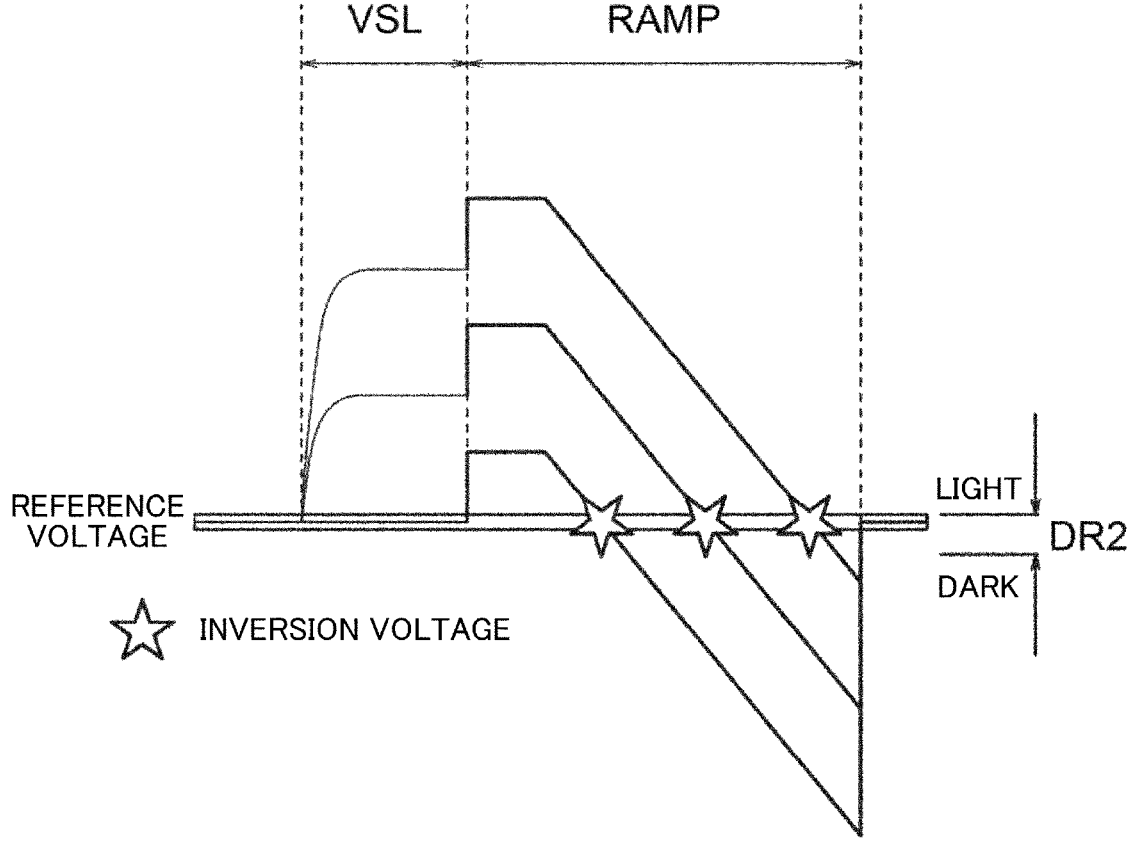

FIG. 5B is a voltage waveform diagram illustrating an inversion voltage of the AD converter according to the first embodiment.

Figure 6:
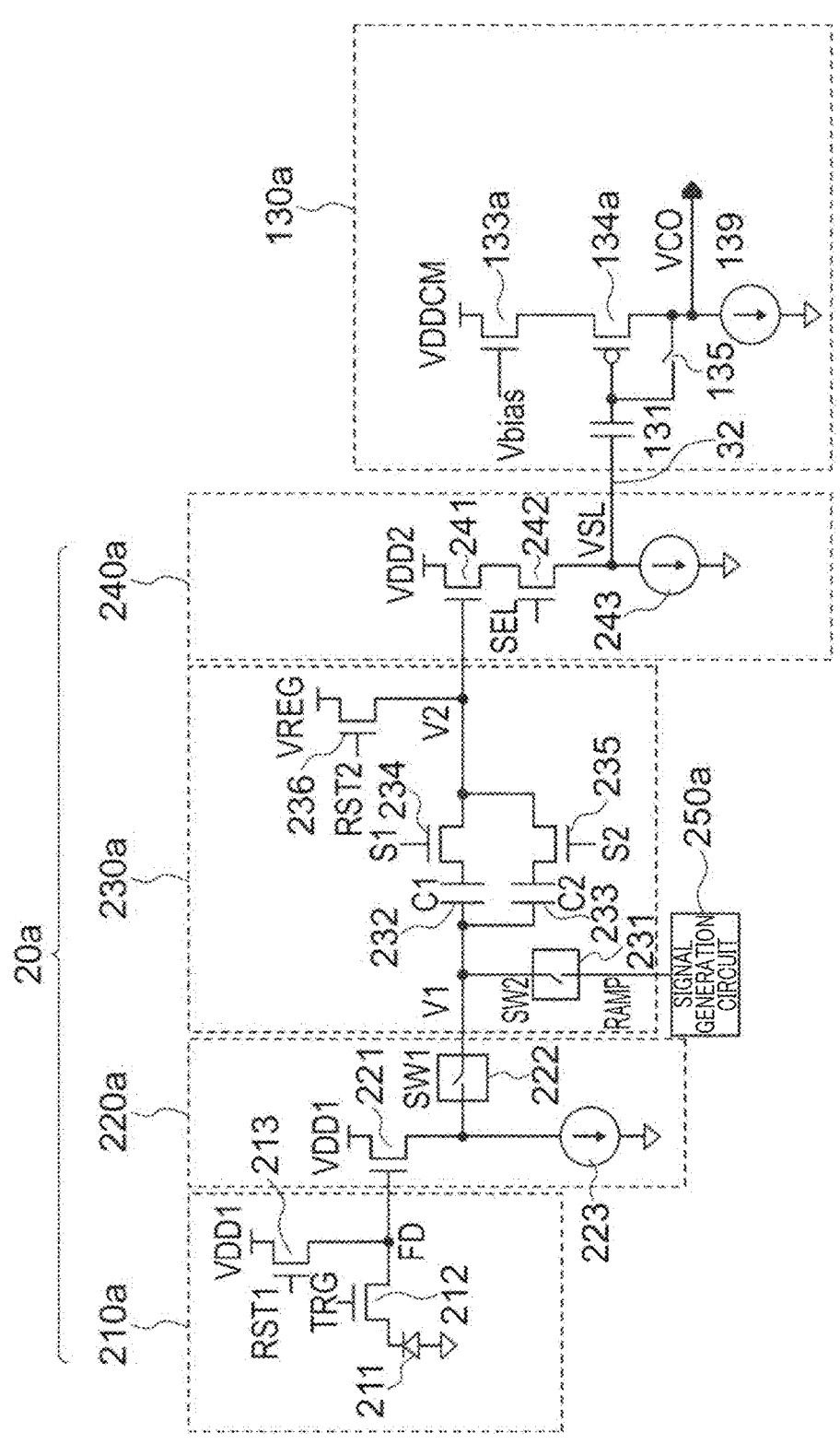

FIG. 6 is a diagram illustrating a circuit configuration of a pixel and an AD converter of an imaging device according to a second embodiment.

Figure 7:
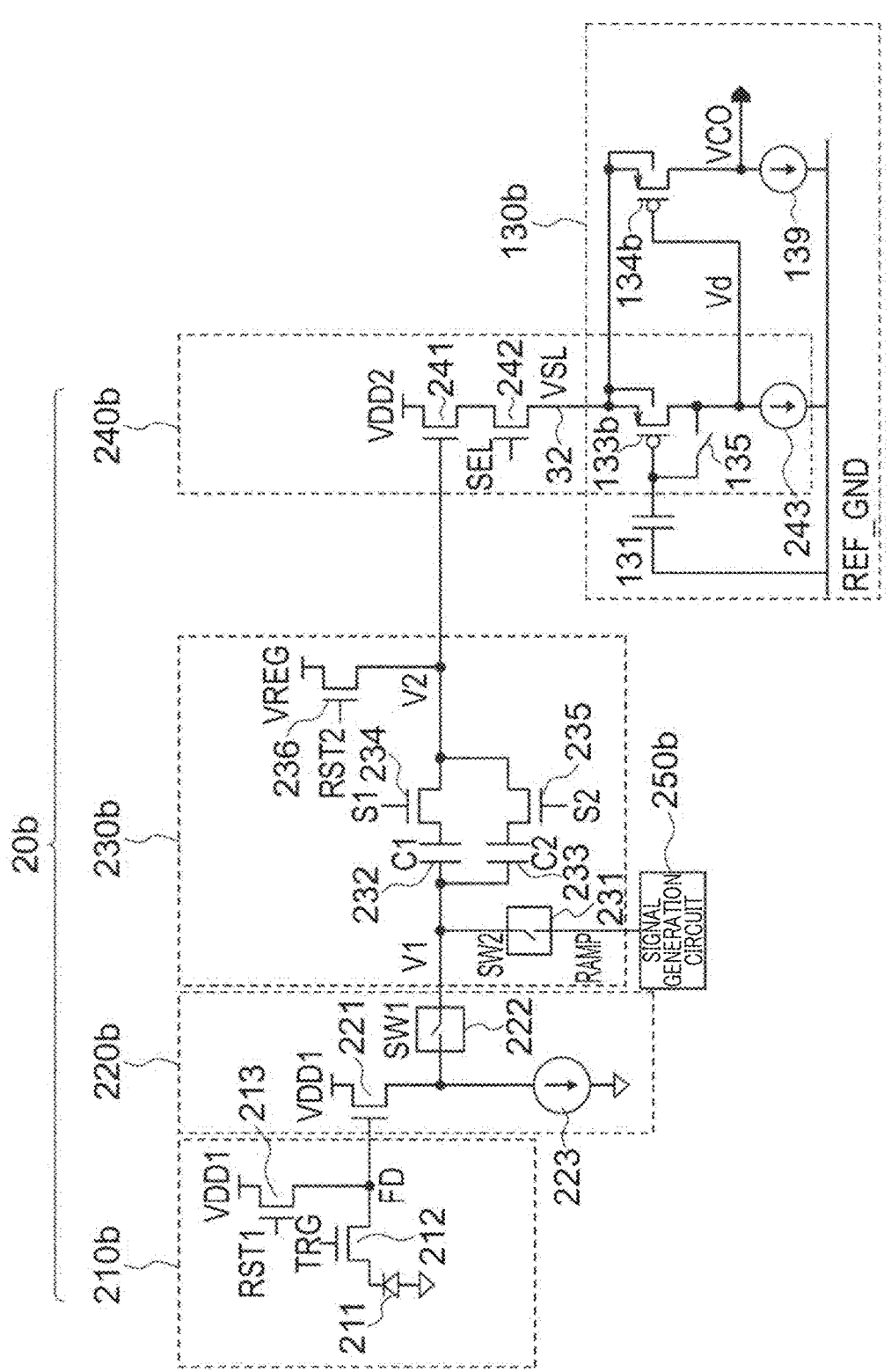

FIG. 7 is a diagram illustrating a circuit configuration of a pixel and an AD converter of an imaging device according to a third embodiment.

Figure 8:
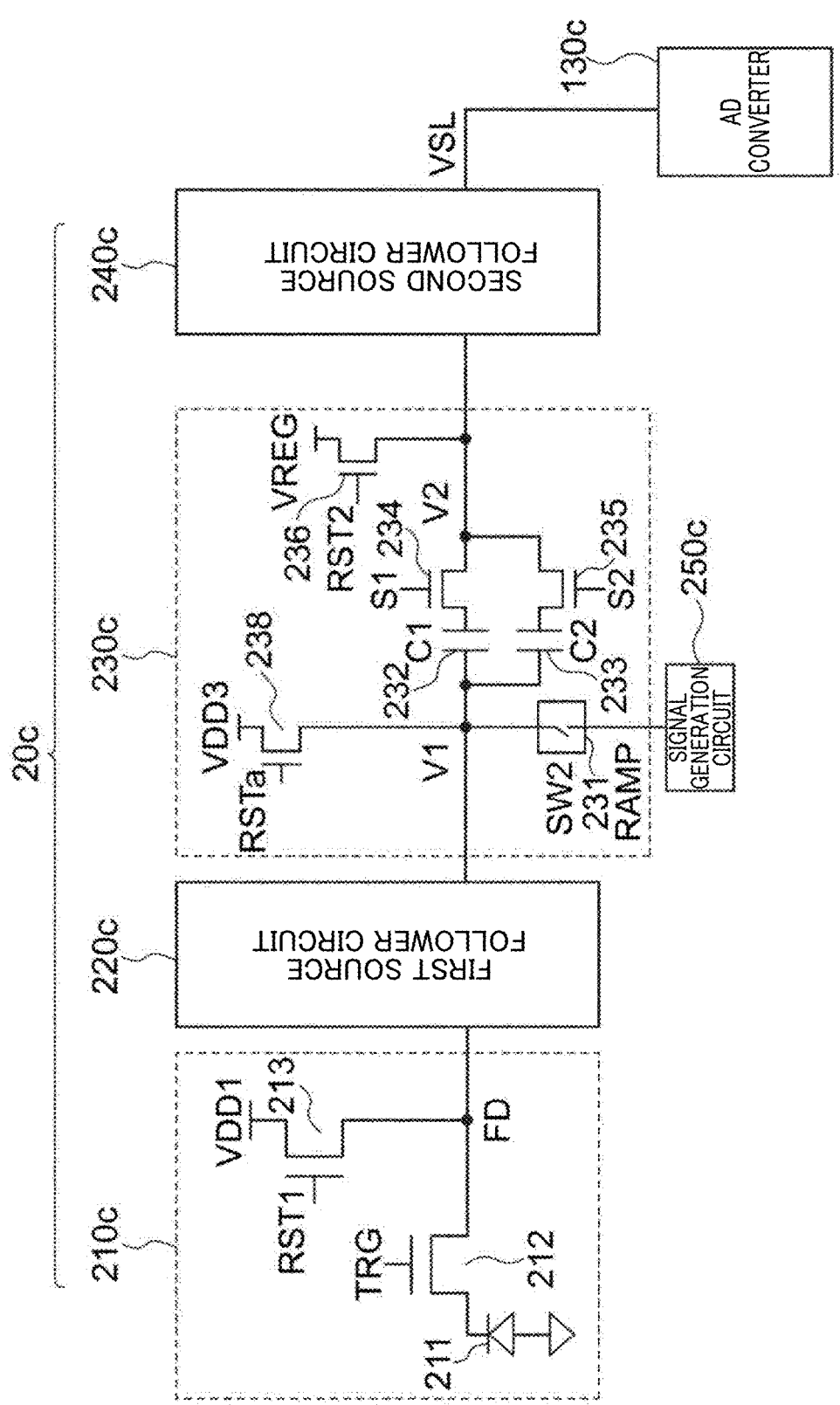

FIG. 8 is a diagram illustrating a circuit configuration of a pixel of an imaging device according to a fourth embodiment.

Figure 9:
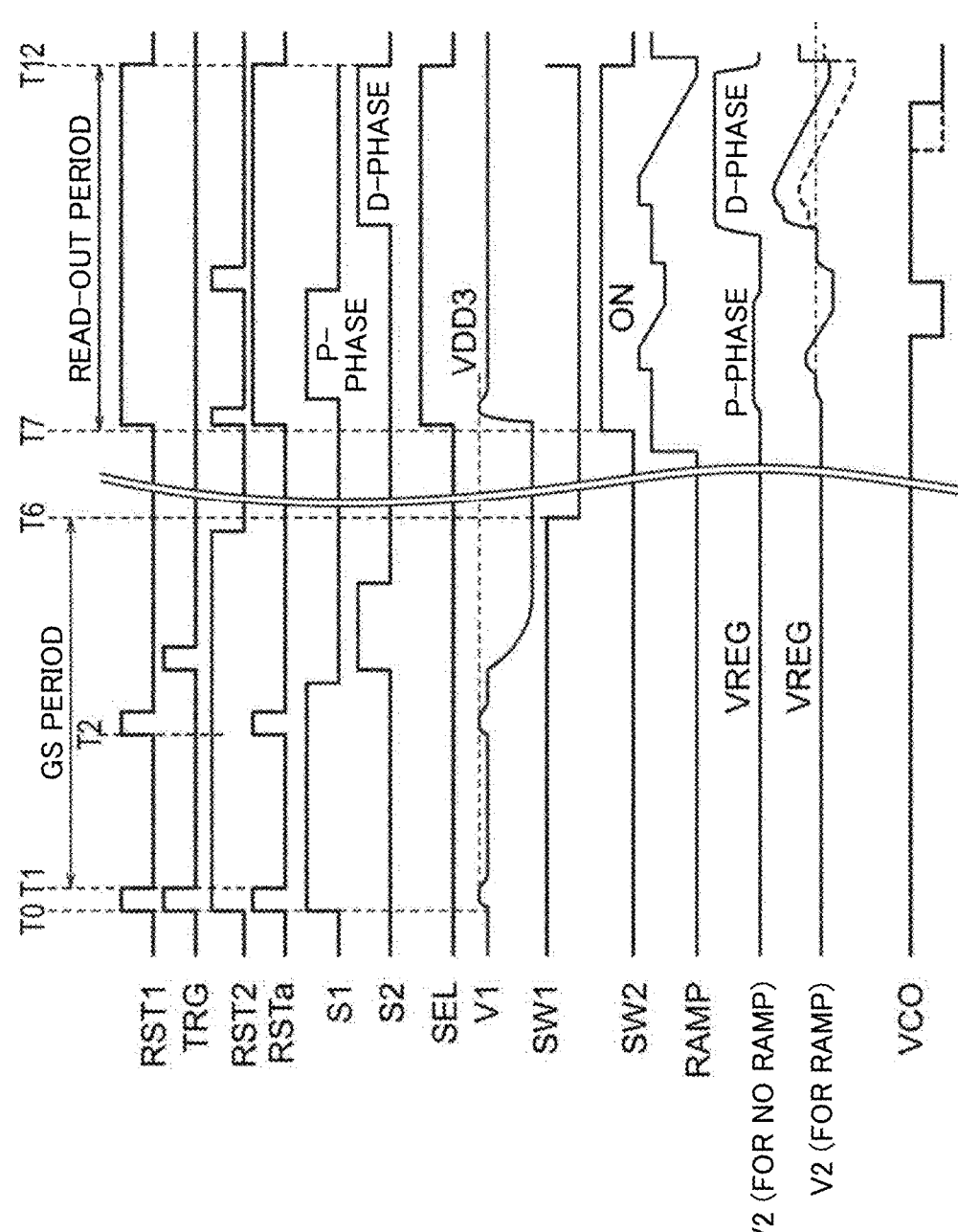

FIG. 9 is a timing chart for explaining the operation of the pixel according to the fourth embodiment.

Figure 10:
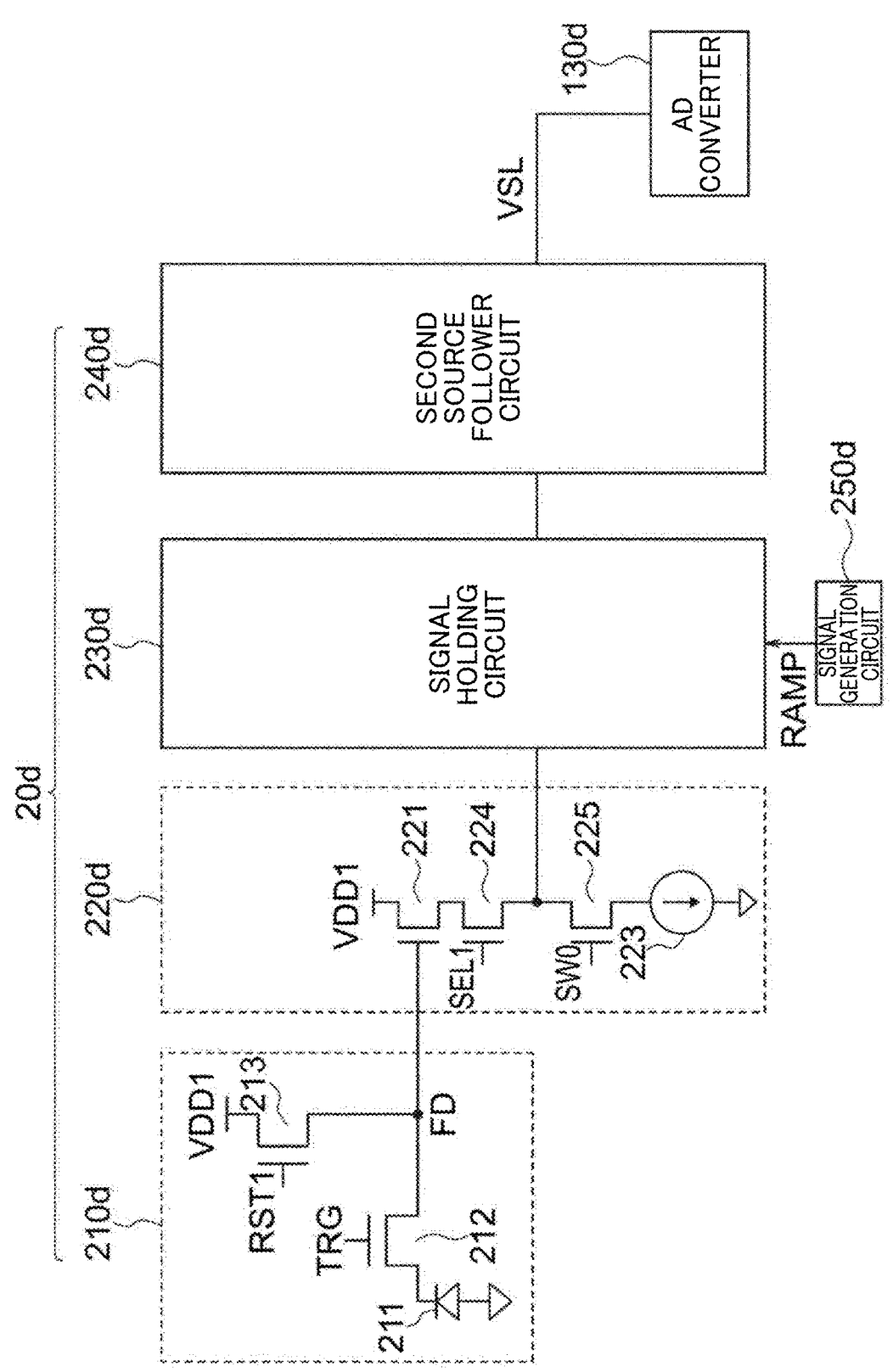

FIG. 10 is a diagram illustrating a circuit configuration of a pixel of an imaging device according to a fifth embodiment.

Figure 11:
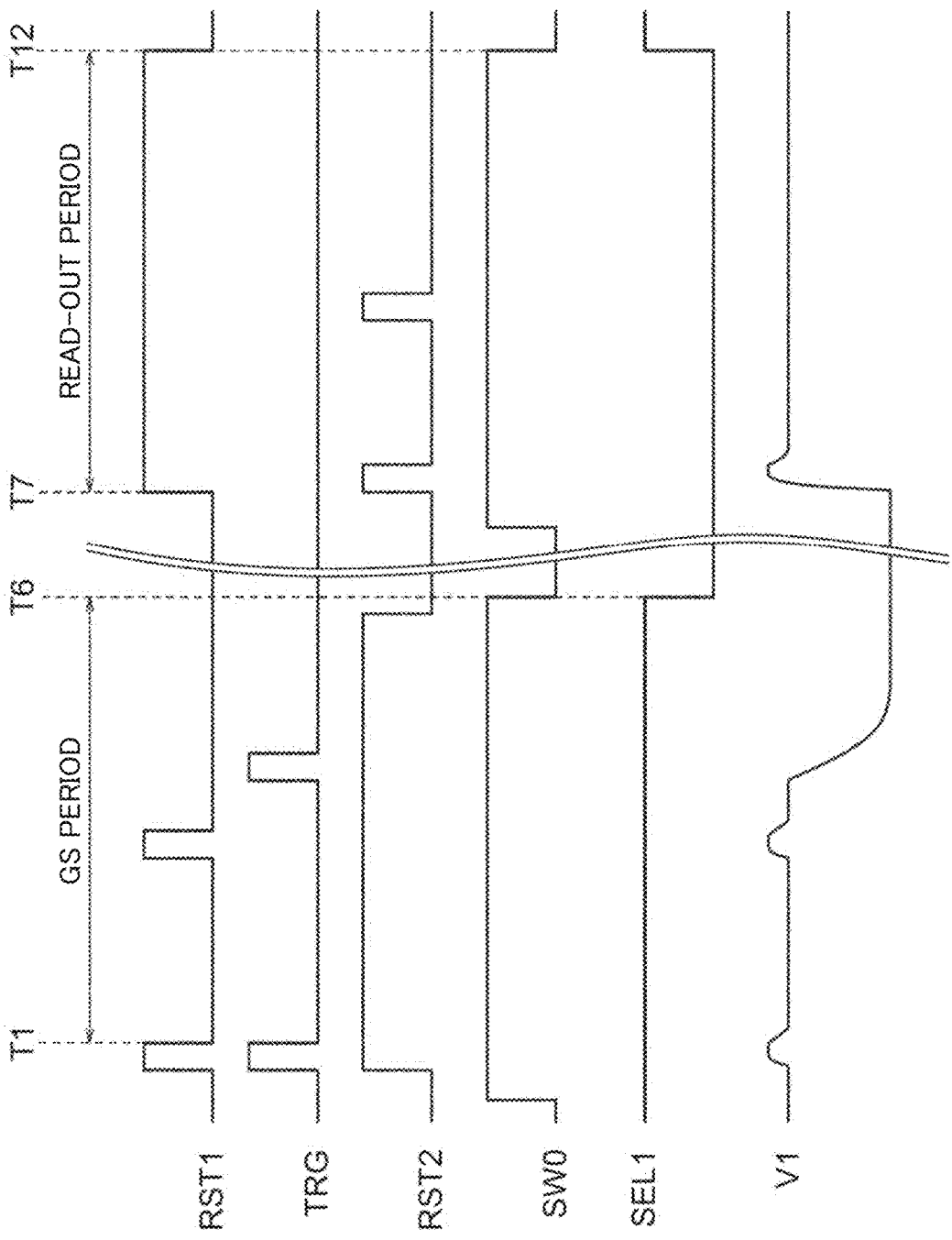

FIG. 11 is a timing chart for explaining the operation of the pixel according to the fifth embodiment.

Figure 12:
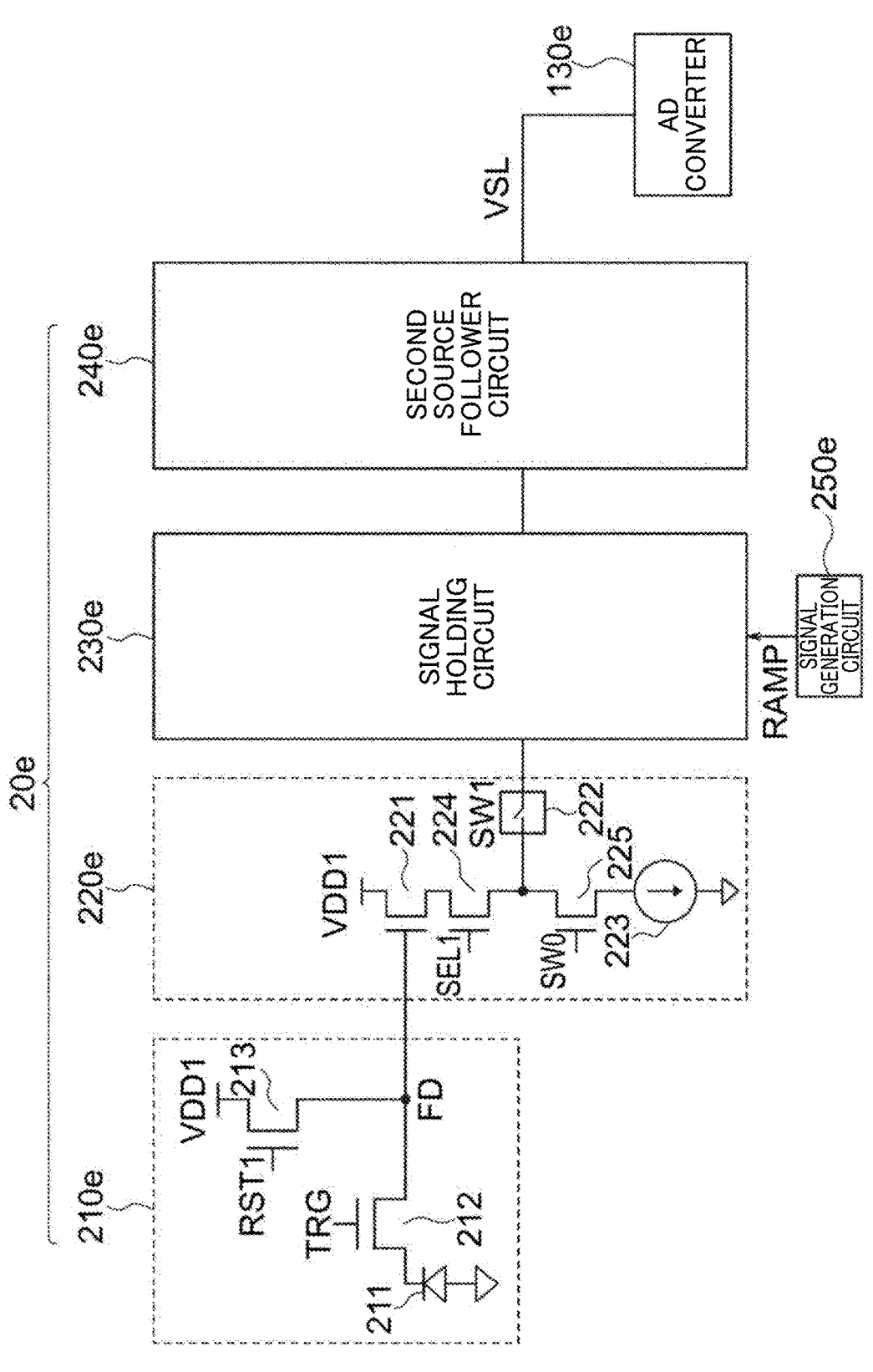

FIG. 12 is a diagram illustrating a circuit configuration of a pixel of an imaging device according to a sixth embodiment.

Figure 13:
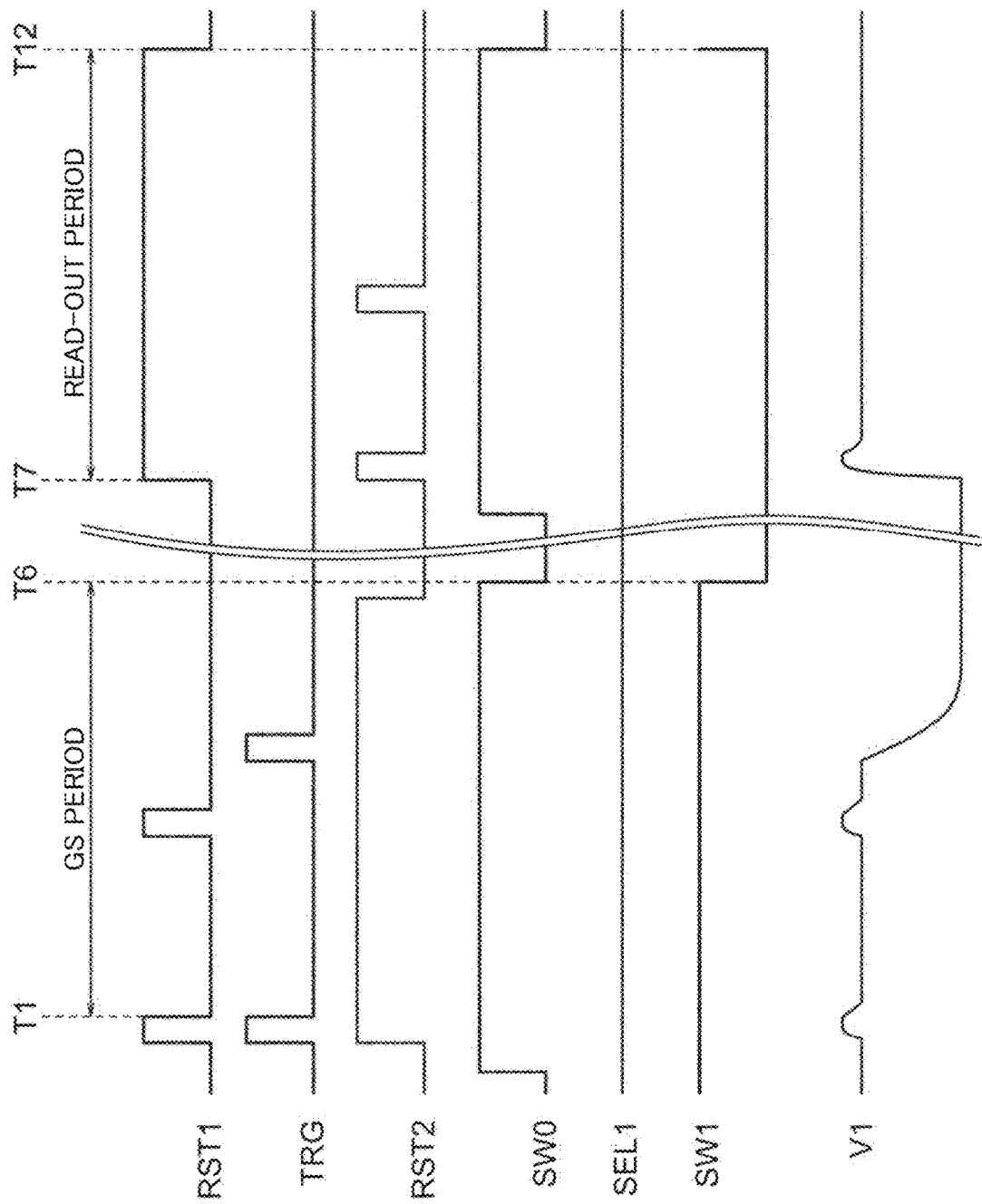

FIG. 13 is a timing chart for explaining the operation of the pixel according to the sixth embodiment.

Figure 14:
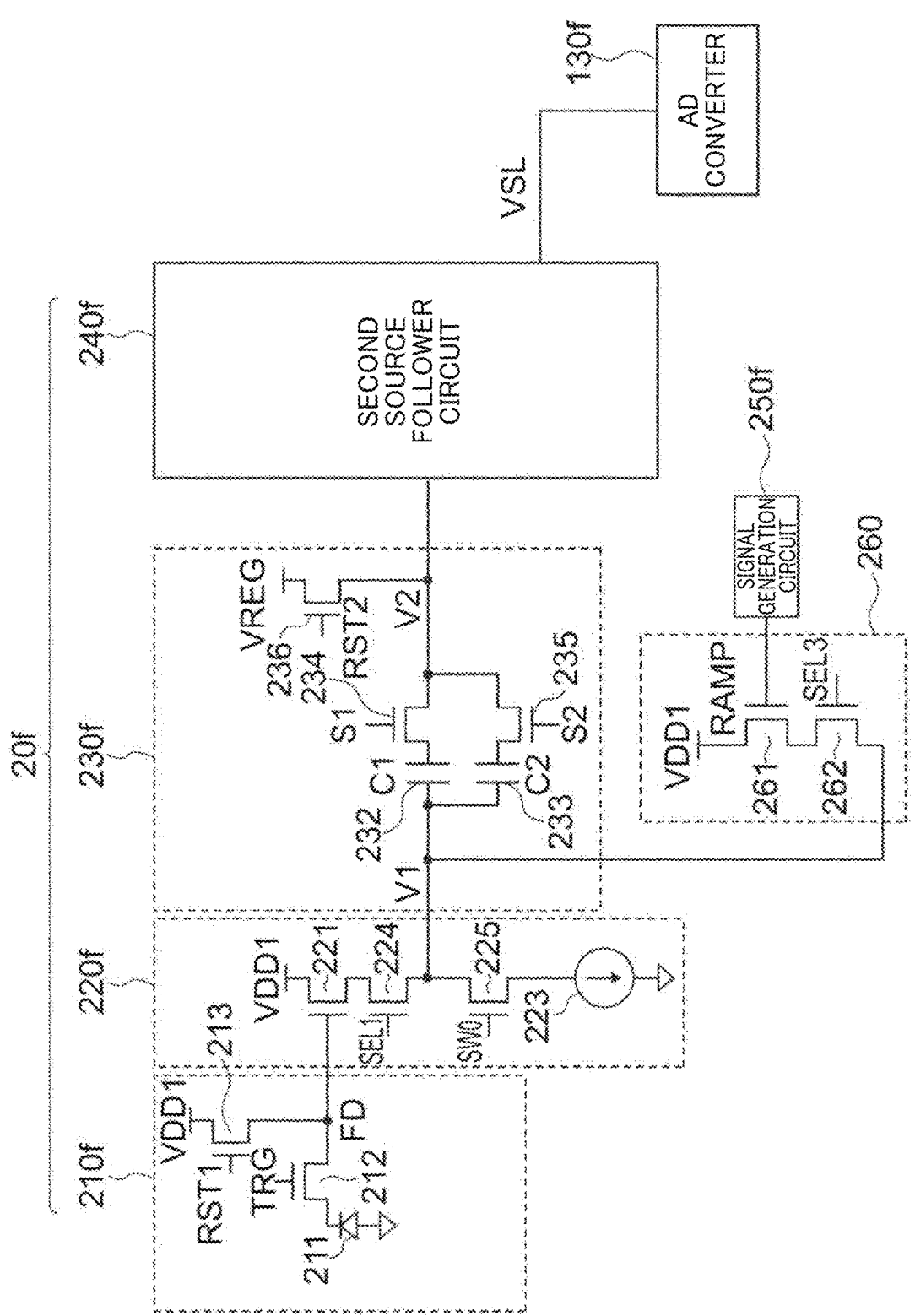

FIG. 14 is a diagram illustrating a circuit configuration of a pixel of an imaging device according to a seventh embodiment.

Figure 15:
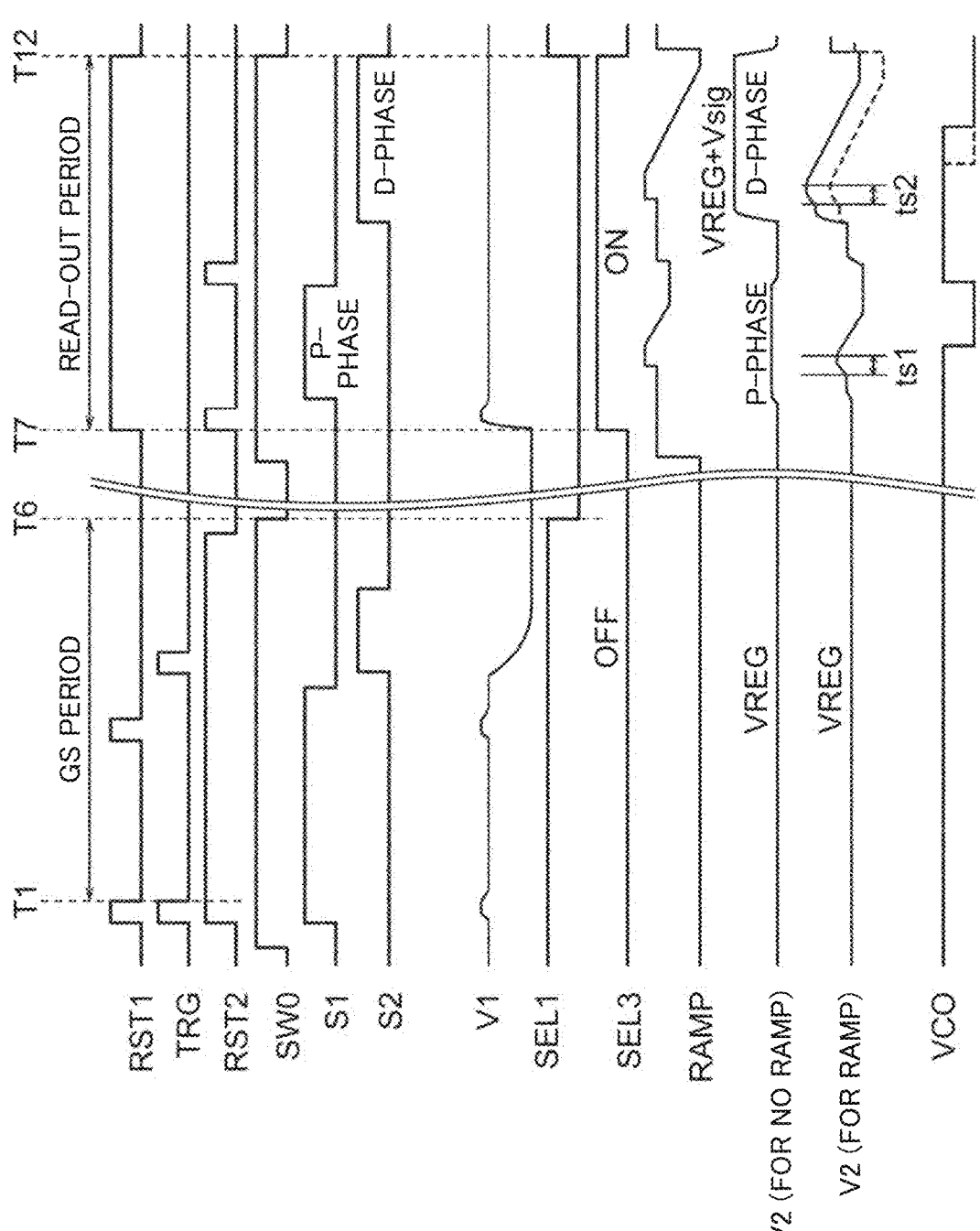

FIG. 15 is a timing chart for explaining the operation of the pixel according to the seventh embodiment.

Figure 16:
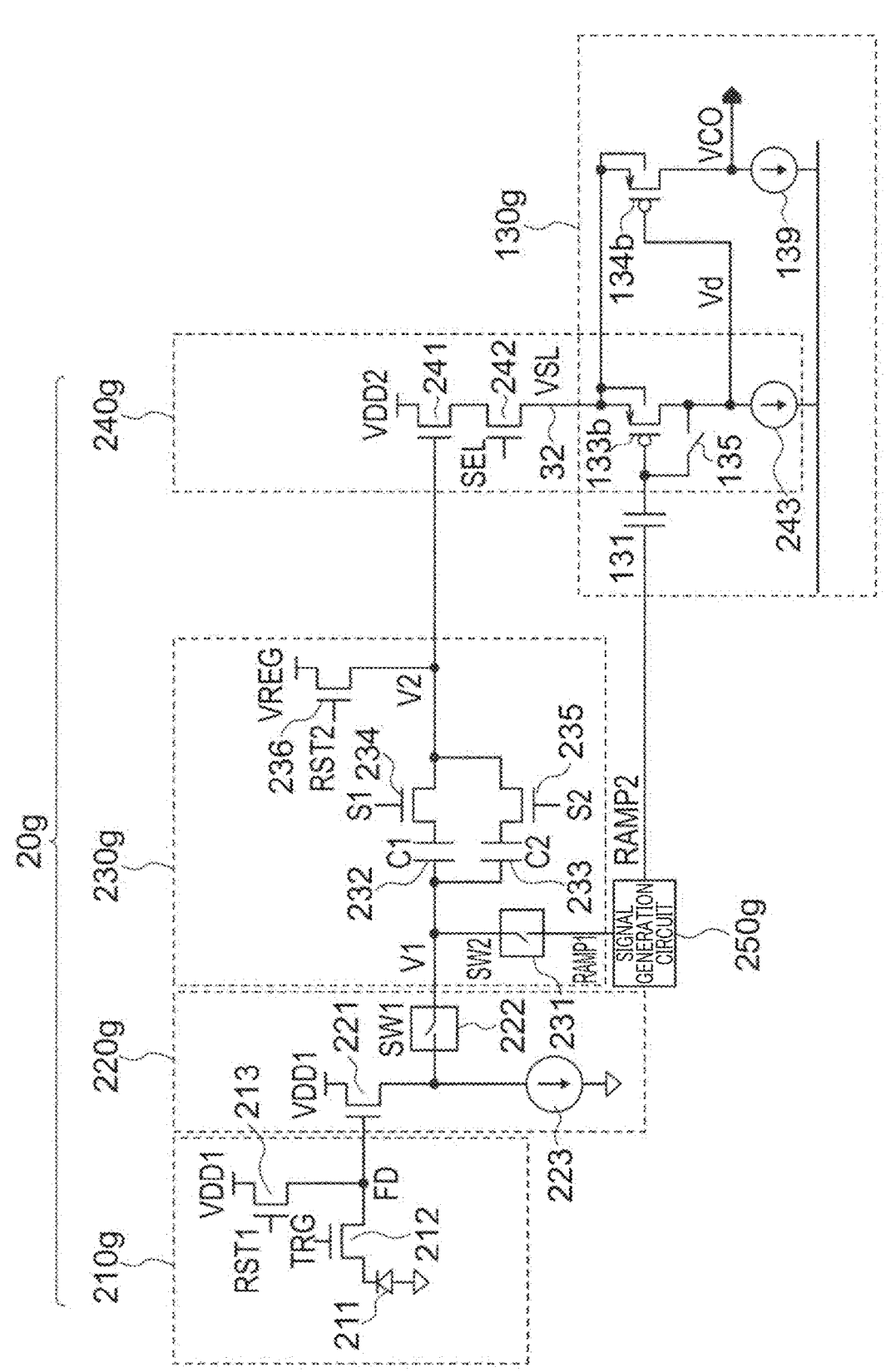

FIG. 16 is a diagram illustrating a circuit configuration of a pixel of an imaging device according to an eighth embodiment.

Figure 17:
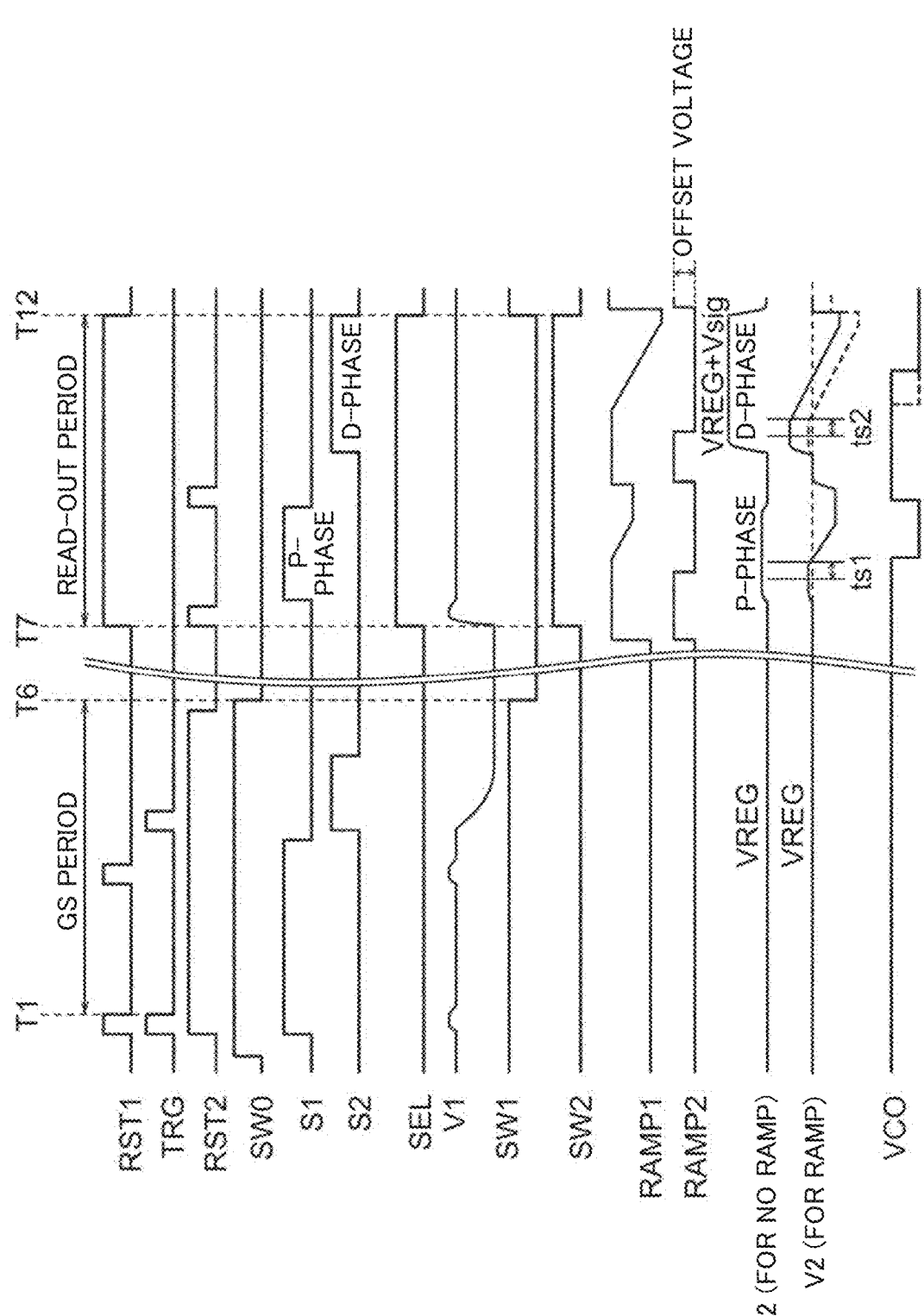

FIG. 17 is a timing chart for explaining the operation of the pixel according to the eighth embodiment.

Figure 18:
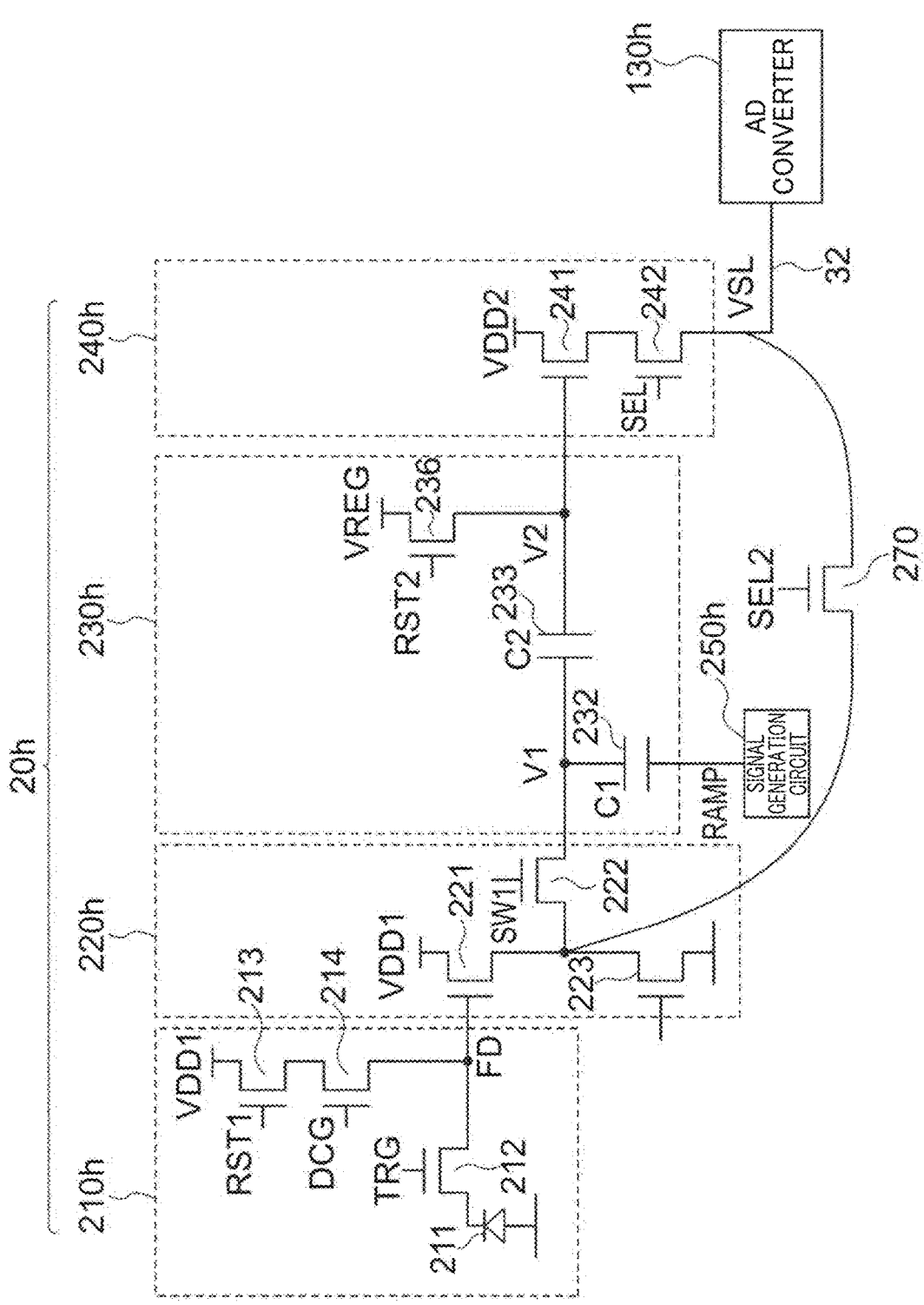

FIG. 18 is a diagram illustrating a circuit configuration of a pixel of an imaging device according to a ninth embodiment.

Figure 19:
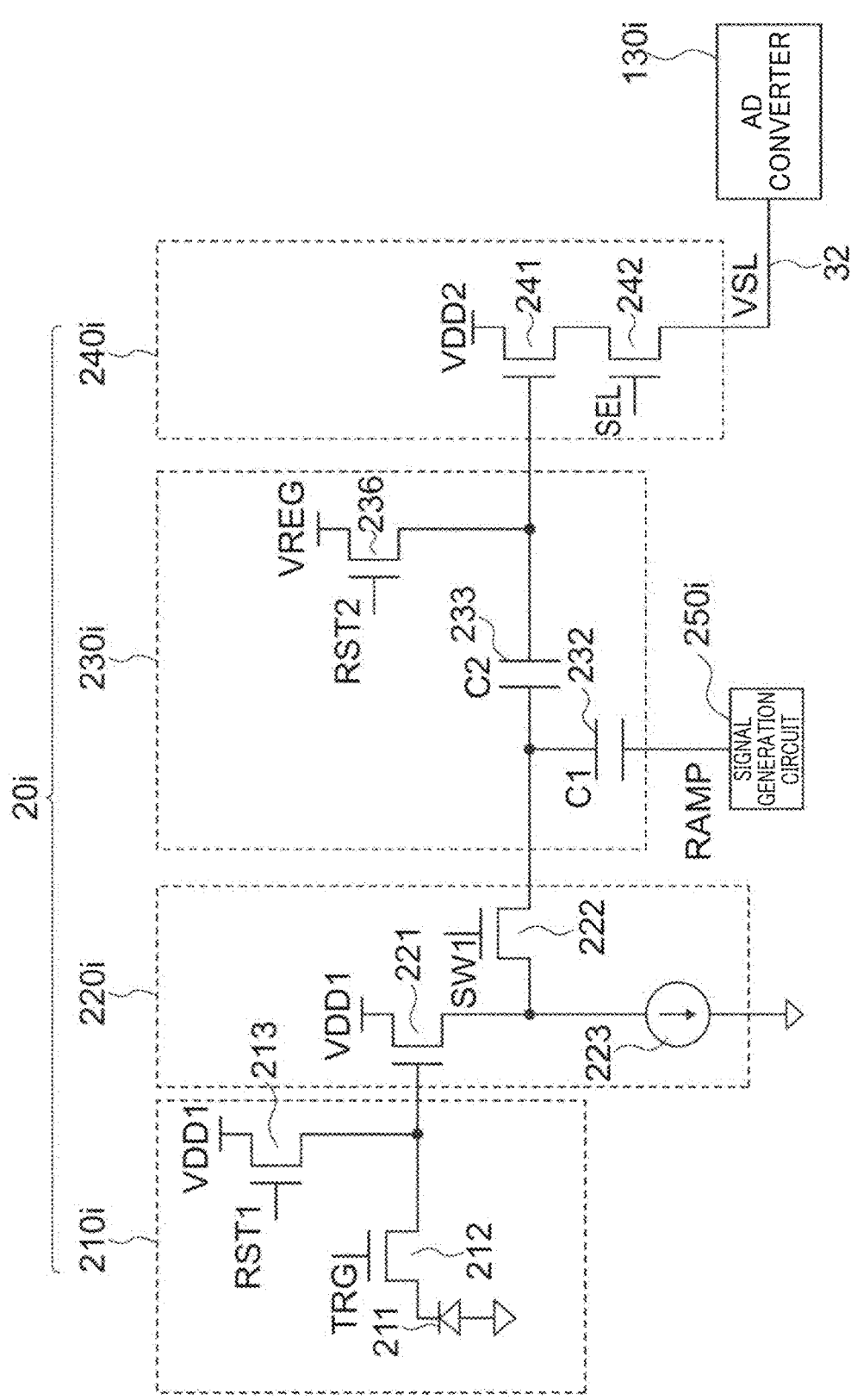

FIG. 19 is a diagram illustrating a circuit configuration of a pixel of an imaging device according to a tenth embodiment.

Figure 20:
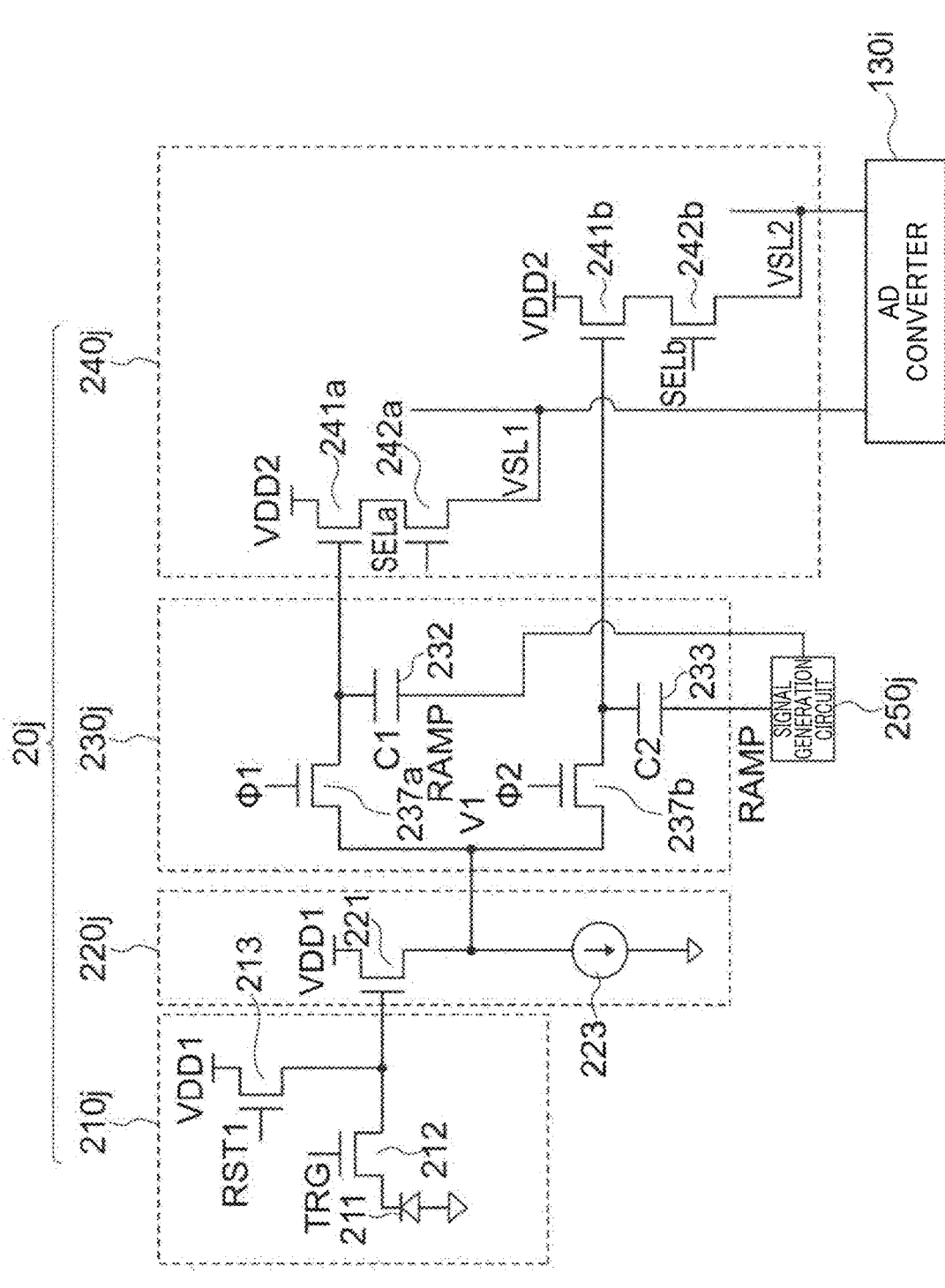

FIG. 20 is a diagram illustrating a circuit configuration of a pixel of an imaging device according to an eleventh embodiment.

Figure 21:
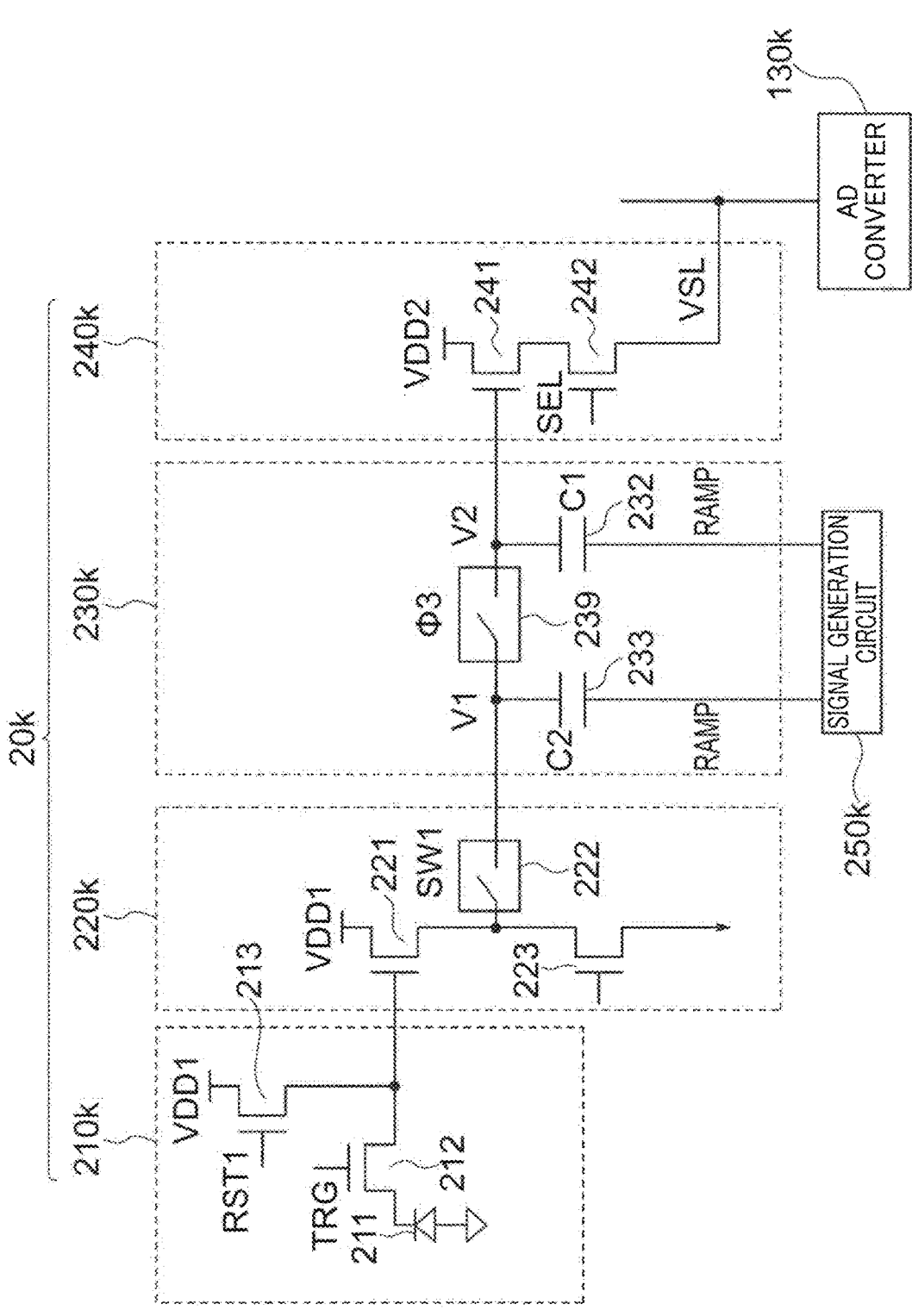

FIG. 21 is a diagram illustrating a circuit configuration of a pixel of an imaging device according to a twelfth embodiment.

Figure 22:
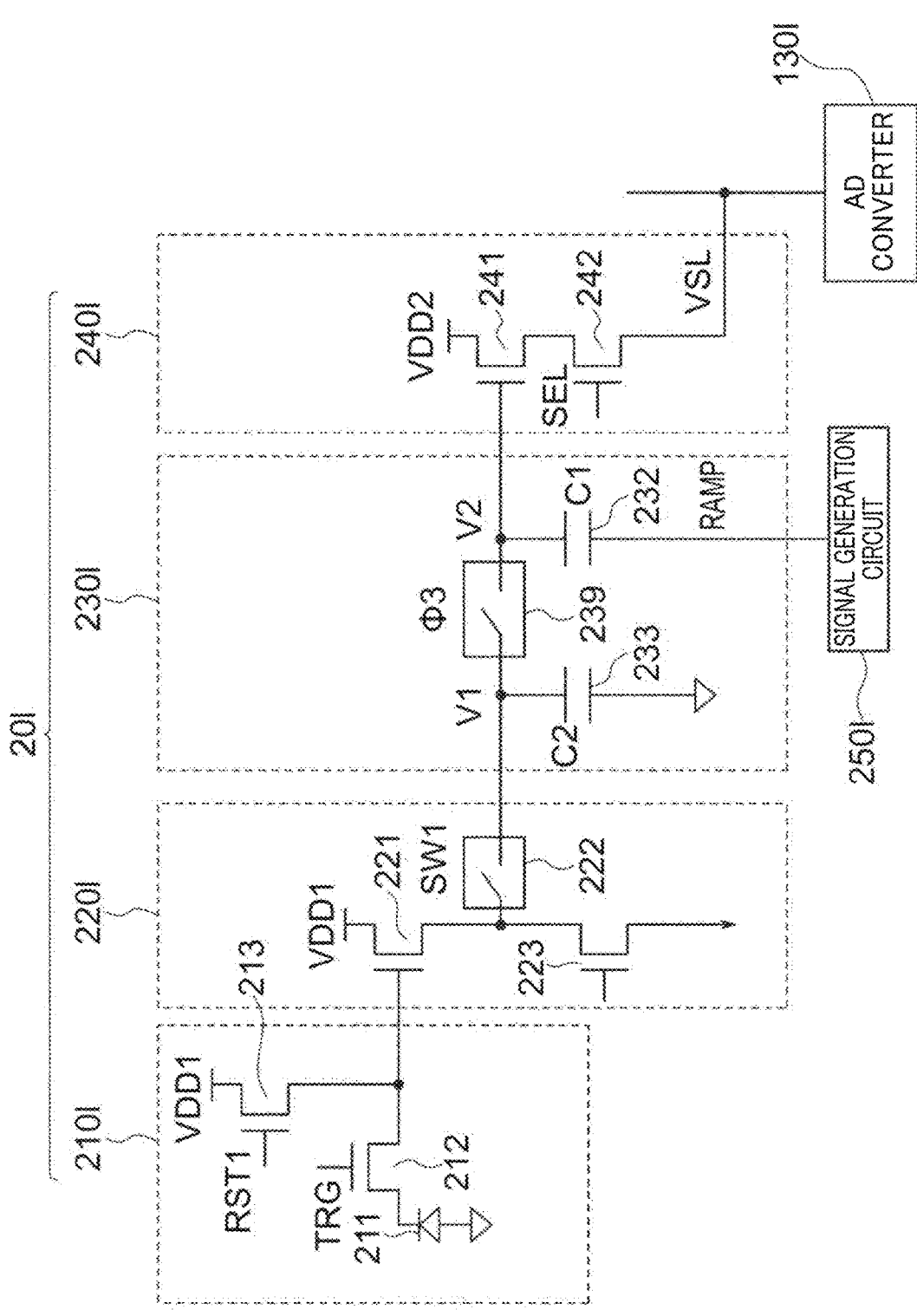

FIG. 22 is a diagram illustrating a circuit configuration of a pixel of an imaging device according to a thirteenth embodiment.

Figure 23:
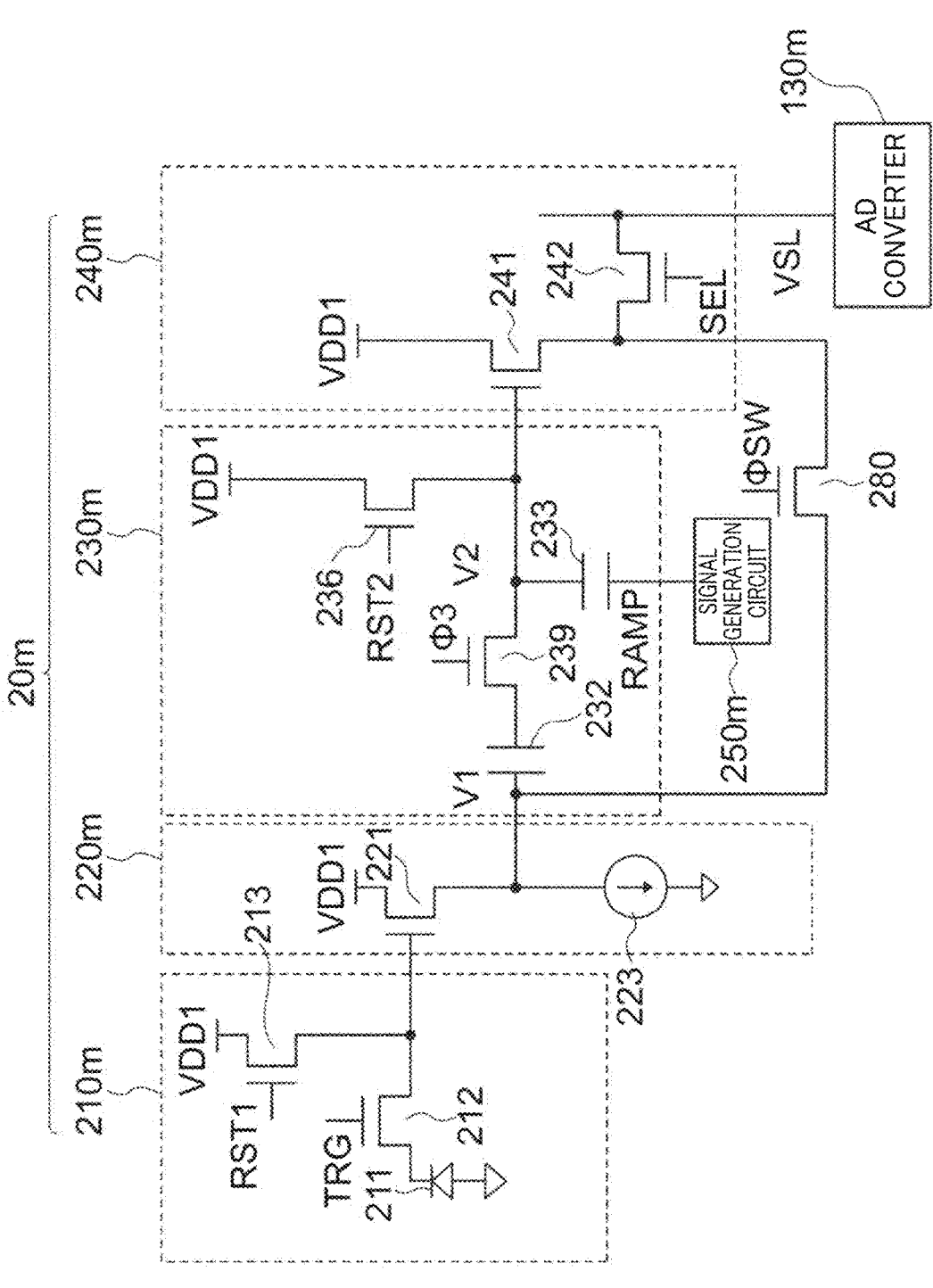

FIG. 23 is a diagram illustrating a circuit configuration of a pixel of an imaging device according to a fourteenth embodiment.

Figure 24:
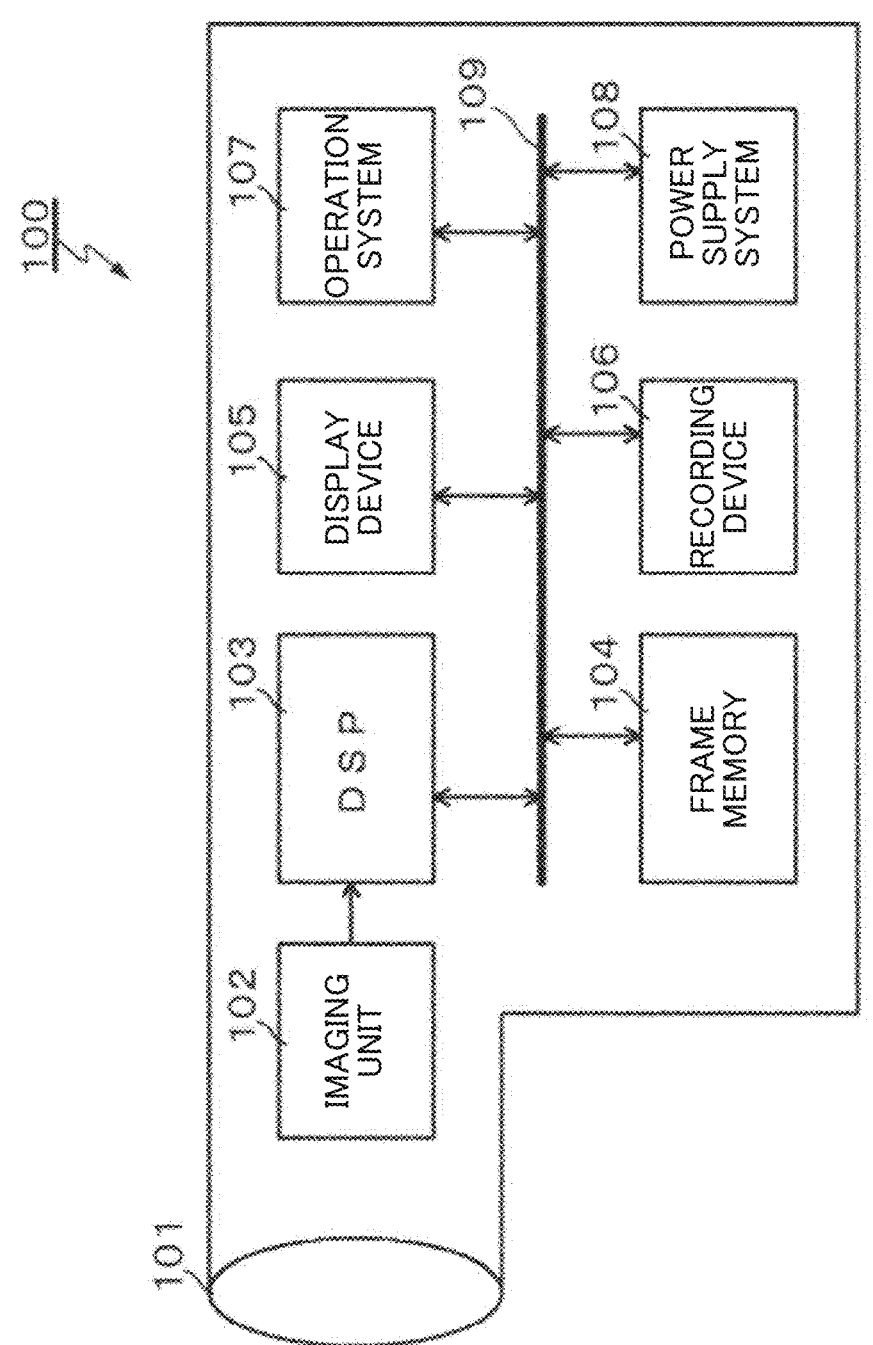

FIG. 24 is a block diagram illustrating a configuration example of an electronic apparatus according to a fifteenth embodiment.

Figure 25:
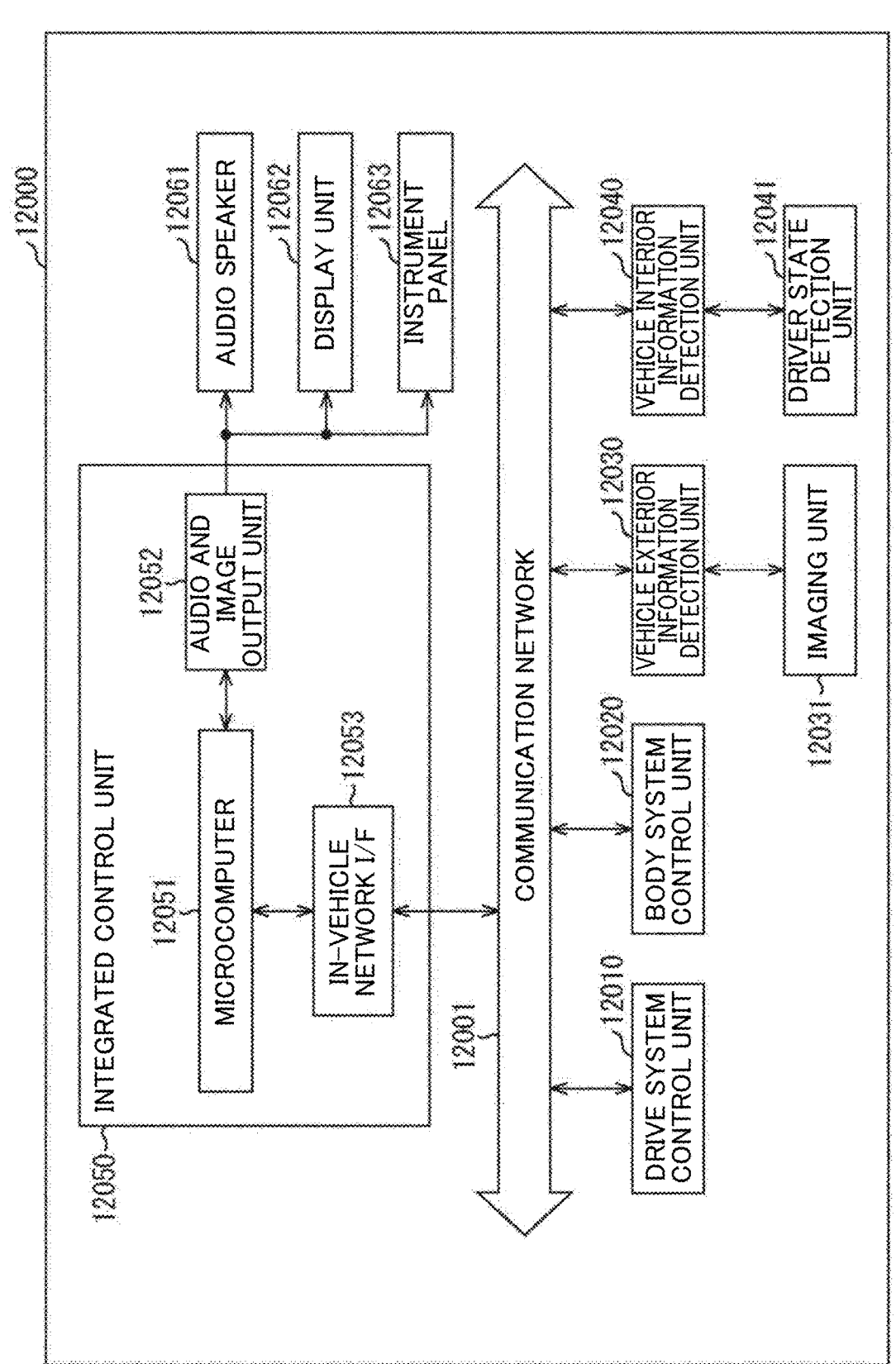

FIG. 25 is a block diagram illustrating an example of a schematic configuration of a vehicle control system.

FIG. 26 is an explanatory diagram illustrating an example of installation positions of a vehicle exterior information detection unit and imaging units.

DESCRIPTION OF EMBODIMENTS

First Embodiment

Figure 1:
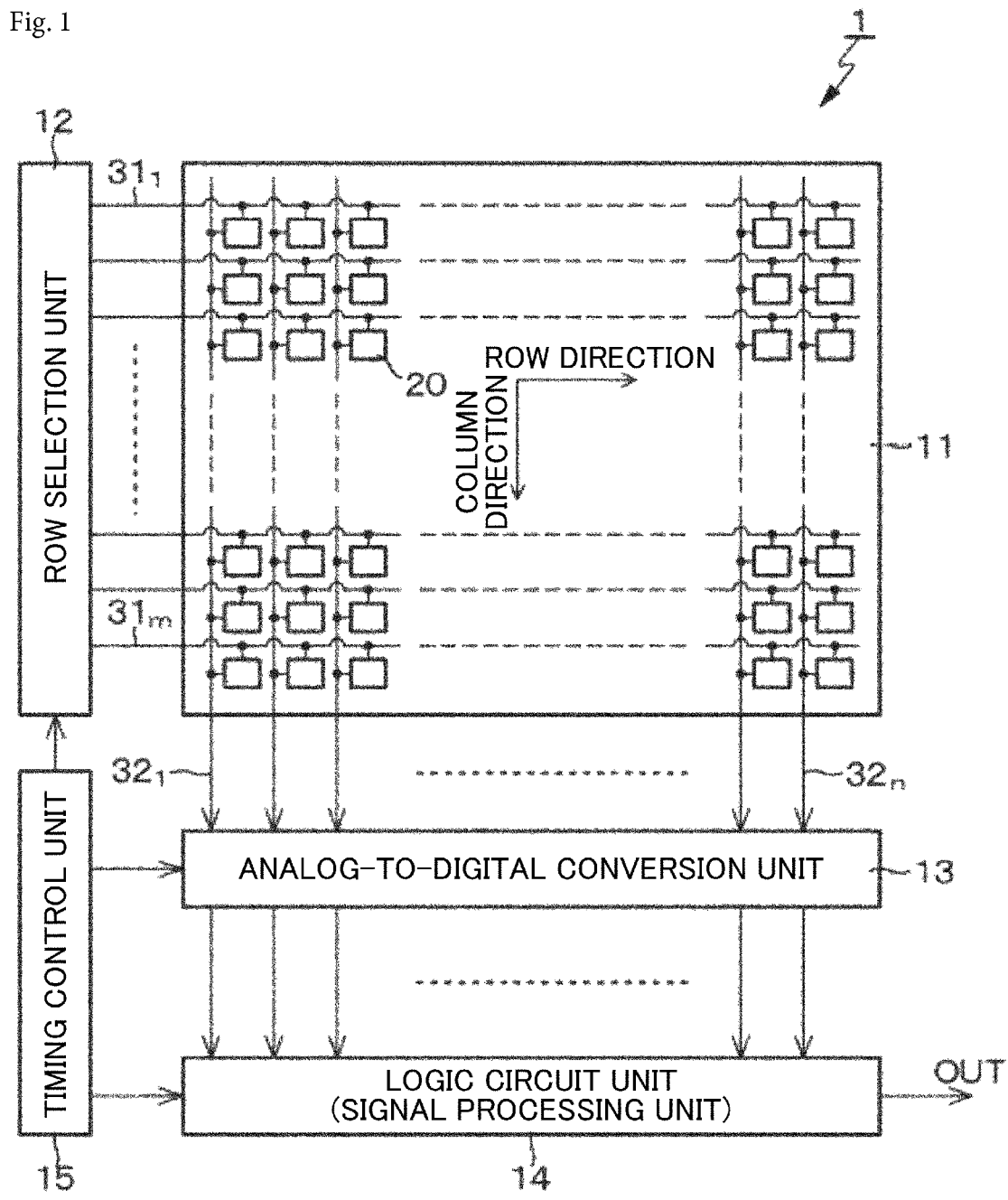
FIG. 1 is a block diagram illustrating a configuration of an imaging device according to a first embodiment.

FIG. 1 is a block diagram illustrating a configuration of an imaging device according to a first embodiment.

The imaging device 1 according to the present embodiment includes a pixel array unit 11 and peripheral circuit units for the pixel array unit 11. In the pixel array unit 11, pixels (pixel circuits) 20 including light receiving elements are two-dimensionally arranged in the row and column directions, that is, in a matrix. The row direction as used herein refers to a direction in which pixels 20 in a pixel row are arranged, and the column direction refers to a direction, which is perpendicular to the row direction, in which pixels 20 in a pixel column are arranged. The pixel 20 photoelectrically converts incident light to generate and accumulate charges according to an amount of light received.

As illustrated in FIG. 1, the peripheral circuit units for the pixel array unit 11 includes a row selection unit 12, an analog-to-digital conversion unit 13, a logic circuit unit 14 serving as a signal processing unit, and a timing control unit 15.

In the pixel array unit 11, a pixel control line 31 ($31_1$ to $31_m$) is wired for each pixel row along the row direction. Moreover, a signal line 32 ($32_1$ to $32_n$) is wired for each pixel column along the column direction. The pixel control line 31 transmits a drive signal for performing driving at the time of reading out a signal from the corresponding pixel 20. Note that, in FIG. 1, the pixel control line 31 is illustrated as one wire, but the number of wires is not limited to one. One end of the pixel control line 31 is connected to an output end of the row selection unit 12 for the corresponding pixel row.

The row selection unit 12 includes a shift register, an address decoder, or the like, and controls scanning of the pixel rows and addresses of the pixel rows to select pixels 20 of the pixel array unit 11. Although a specific configuration of the row selection unit 12 is not illustrated in the drawing, the row selection unit 12 typically includes two scanning systems, that is, a read-out scanning system and a sweep-out scanning system.

The read-out scanning system selectively scans the pixels 20 of the pixel array unit 11 in order in units of rows in order to read out signals from the pixels 20. The pixel signals read from the pixels 20 are analog signals. The sweep-out scanning system performs sweep-out scanning on a read out row on which read-out scanning is performed by the read-out scanning system, ahead of the read-out scanning by the time of a shutter speed.

The sweep-out scanning by the sweep-out scanning system sweeps out unnecessary charges from the photoelectric conversion elements of the pixels 20 in the read-out row, thereby resetting the photoelectric conversion elements. A so-called electronic shutter operation is performed by sweeping out (resetting) the unnecessary charges in the sweeping scanning system. The electronic shutter operation refers to an operation of discarding the charge of the photoelectric conversion element and newly starting exposure (starting charge accumulation).

The analog-to-digital conversion unit 13 is composed of a collection of a plurality of AD converters 130 provided corresponding to the pixel columns of the pixel array unit 11, respectively (for example, for the respective pixel columns). The analog-to-digital conversion unit 13 is a column-parallel type of analog-to-digital conversion unit that converts an analog pixel signal output through each of the signal lines $32_1$ to $32_n$ into a digital pixel signal.

The logic circuit unit 14, which is a signal processing unit, reads out the pixel signal digitized by the analog-digital conversion unit 13 and performs predetermined signal processing on the pixel signal. Specifically, the logic circuit unit 14 performs predetermined signal processing, for example, digital signal processing such as vertical line defect correction, point defect correction, signal clamping, parallel-serial conversion, compression, encoding, addition, averaging, and intermittent operation. The logic circuit unit 14 outputs the generated image data as an output signal OUT of the imaging device 1 to a device at a subsequent stage.

The timing control unit 15 generates various types of timing signals, clock signals, control signals, and the like based on a synchronization signal given from the outside. Then, the timing control unit 15 controls, based on these generated signals, driving of the row selection unit 12, the analog-to-digital conversion unit 13, and the logic circuit units 14.

FIG. 2 is a diagram illustrating a circuit configuration of the pixel 20 and the AD converter 130 according to the first embodiment.

The circuit configuration of the pixel 20 will be first described. The pixel 20 includes a photoelectric conversion circuit 210, a first source follower circuit 220, a signal holding circuit 230, a second source follower circuit 240, and a signal generation circuit 250. The circuits will be described below.

The photoelectric conversion circuit 210 includes a photoelectric conversion element 211, a transfer transistor 212, and a first reset transistor 213. As the photoelectric conversion element 211, a photodiode such as an avalanche photodiode may be used. The photoelectric conversion element 211 receives incident light and accumulates photocharges according to the amount of light received. The anode of the photoelectric conversion element 211 is connected to a low-potential-side power source (for example, ground). The cathode of the photoelectric conversion element 211 is connected to the first source follower circuit 220 through the transfer transistor 212.

The transfer transistor 212 is configured by, for example, an N-channel MOS transistor. A transfer signal TRG is input to the gate of the transfer transistor 212 from the row selection unit 12 via the corresponding pixel control line 31. When the transfer transistor 212 is turned on according to the level of the transfer signal TRG, the photocharges accumulated in the photoelectric conversion element 211 are transferred to a floating diffusion (a floating diffusion region or an impurity diffusion region) FD. The floating diffusion FD is an electrical connection region between the transfer transistor 212 and the first source follower circuit 220, and functions as a charge-voltage conversion unit that converts the photocharges photoelectrically converted by the photoelectric conversion element 211 into a voltage signal.

The first reset transistor 213 is connected between a positive power supply that supplies a power supply voltage VDD1 and the floating diffusion FD. The first reset transistor 213 is configured by, for example, an N-channel MOS transistor, and a first reset signal RST1 is input to the gate of the first reset transistor 213 from the row selection unit 12 via the corresponding pixel control line 31. When the first reset transistor 213 is turned on based on a first reset signal RST1 with high level, the charges in the floating diffusion FD are discharged to the positive power supply. As a result, the floating diffusion FD is reset.

The first source follower circuit 220 is a circuit for amplifying the voltage signal held in the floating diffusion FD, and includes a first amplifier transistor 221, a first switch 222, and a first current source 223.

The first amplifier transistor 221 is an element for amplifying the output signal of the photoelectric conversion circuit 210, and is configured by, for example, an N-channel MOS transistor. The gate of the first amplifier transistor 221 is connected to the floating diffusion FD. The drain thereof is connected to the positive power supply that supplies the power supply voltage VDD1. The source thereof is connected to each of the first switch 222 and the first current source 223. The first amplifier transistor 221 amplifies and outputs the voltage signal read out from the floating diffusion FD.

The first switch 222 is an element for switching whether or not to transmit the voltage signal amplified by the first amplifier transistor 221 to the signal holding circuit 230, and is configured by, for example, an N-channel MOS transistor. A first switching signal SW1 is input to the gate of the first switch 222 from the row selection unit 12 via the corresponding pixel control line 31. The drain thereof is connected to each of the source of the first amplifier transistor 221 and the first current source 223. The source thereof is connected to the signal holding circuit 230. When the first switch 222 is turned on based on a first switching signal SW1 with high level, the output signal of the first amplifier transistor 221 is transmitted to the signal holding circuit 230.

The first current source 223 is connected in series to the first amplifier transistor 221 and supplies a constant current to the first amplifier transistor 221 based on the control of the row selection unit 12.

In the first source follower circuit 220, a reset signal (first signal) and a data signal (second signal) are sequentially output from the first amplifier transistor 221. This reset signal corresponds to a so-called P-phase signal, and indicates the voltage level when the first reset transistor 213 is turned on and the photoelectric conversion circuit 210 becomes a reset state accordingly. On the other hand, the data signal corresponds to a so-called D-phase signal, and indicates a voltage level based on the amount of charges accumulated in the floating diffusion FD through the photoelectric conversion performed by the photoelectric conversion element 211.

The signal holding circuit 230 is a circuit for holding the voltage of the reset signal and the voltage of the data signal, and includes a second switch 231, a first capacitive element 232, a second capacitive element 233, a first sample transistor 234, a second sample transistor 235, and a second reset transistor 236.

The second switch 231 is an element for switching whether or not to supply a ramp signal RAMP generated by the signal generation circuit 250 to the signal holding circuit 230, and is configured by, for example, an N-channel MOS transistor. A second switching signal SW2 is input to the gate of the second switch 231 from the row selection unit 12 via the corresponding pixel control line 31. The drain thereof is connected to an input node V1 that is a connection point between one end of the first capacitive element 232 and one end of the second capacitive element 233. The source thereof is connected to the signal generation circuit 250. When the second switch 231 is turned on based on a second switching signal SW2 with high level, the ramp signal RAMP is transmitted from the signal generation circuit 250 to the first capacitive element 232 and the second capacitive element 233 through the second switch 231.

The first capacitive element 232 is an element for holding the voltage of the reset signal. The second capacitive element 233 is an element for holding the voltage of the data signal. One end of each of the first capacitive element 232 and the second capacitive element is connected to the input node V1. The other end of the first capacitive element 232 is connected to the first sample transistor 234, and the other end of the second capacitive element 233 is connected to the second sample transistor 235. Note that a capacitance C1 of the first capacitive element 232 and a capacitance C2 of the second capacitive element 233 only need to be values that can hold the voltages of the reset signal and the data signal, respectively, and may have the same value or may have different values.

The first sample transistor 234 is an element for setting the timing for holding a reset signal in the first capacitive element 232, and is configured by, for example, an N-channel MOS transistor. A first sample and hold signal S1 is input to the gate of the first sample transistor 234 from the row selection unit 12 via the corresponding pixel control line 31. The drain thereof is connected to the other end of the first capacitive element 232, and the source thereof is connected to each of the second reset transistor 236 and the second source follower circuit 206. When the first sample transistor 234 is turned on based on a first sample and hold signal S1 with high level, the reset signal is held in the first capacitive element 232.

The second sample transistor 235 is an element for setting the timing for holding a data signal in the second capacitive element 233, and is configured by, for example, an N-channel MOS transistor. A second sample and hold signal S2 is input to the gate of the second sample transistor 235 from the row selection unit 12 via the corresponding pixel control line 31. The drain thereof is connected to the other end of the second capacitive element 233, and the source thereof is connected to each of the second reset transistor 236 and the second source follower circuit 206. When the second sample transistor 235 is turned on based on a second sample and hold signal S2 with high level, the data signal is held in the second capacitive element 233.

The second reset transistor 236 is an element for resetting the potential of an output node V2 of the signal holding circuit 230, and is configured by, for example, an N-channel MOS transistor. A second reset signal RST2 is input to the gate of the second reset transistor 236 from the row selection unit 12 via the corresponding pixel control line 31. The drain thereof is connected to a regulator that outputs a constant voltage Vreg. The constant voltage Vreg is set to a potential lower than the power supply voltage VDD1. The source thereof is connected to the source of each of the first sample transistor 234 and the second sample transistor 235. When the second reset transistor 236 is turned on based on a second reset signal RST2 with high level, the potential of the output node V2 is reset to the constant voltage Vreg.

The second source follower circuit 240 is a circuit for selectively reading out and amplifying the reset signal or data signal from the signal holding circuit 230, and includes a second amplifier transistor 241, a selection transistor 242, and a second current source 243.

The second amplifier transistor 241 is an element for amplifying the reset signal and data signal read out from the signal holding circuit 230, and is configured by, for example, an N-channel MOS transistor. The gate of the second amplifier transistor 241 is connected to the output node V2 of the signal holding circuit 230. The drain thereof is connected to a positive power supply that supplies a power supply voltage VDD2. The power supply voltage VDD2 is the same potential as the power supply voltage VDD1 described above. The source thereof is connected to the selection transistor 242.

The selection transistor 242 is an element for selecting whether or not to transmit the reset signal or data signal amplified by the second amplifier transistor 241 to the AD converter 130, and is configured by, for example, an N-channel MOS transistor. A selection signal SEL is input to the gate of the selection transistor 242 from the row selection unit 12 via the corresponding pixel control line 31. The drain thereof is connected to the source of the second amplifier transistor 241, and the source thereof is connected to the second current source 243. When the selection transistor 242 is turned on based on a selection signal SEL with high level, the output signal of the second amplifier transistor 241, that is, an analog pixel signal VSL, is transmitted to the AD converter 130 via the corresponding signal line 32.

The second current source 243 is connected in series to the selection transistor 242. The second current source 243 supplies a constant current to the second amplifier transistor 241 and the selection transistor 242 based on the control of the row selection unit 12.

The signal generation circuit 250 includes, for example, a current integrating digital-to-analog converter (DAC) provided for each pixel column, and generates the ramp signal RAMP. The ramp signal RAMP is composed of a slope portion and an offset portion. In the slope portion, the voltage level changes like a slope that monotonically decreases or increases over time. In the present embodiment, the voltage level in the slope portion monotonically decreases over time. However, that voltage level may monotonically increase according to the voltage waveforms of the reset signal and data signal at the input node V1. In other words, the change in voltage level in the slope portion is appropriately set according to the voltage changes in the reset signal and data signal at the input node V1. On the other hand, the offset portion has a rectangular wave in which two voltage levels, an offset voltage and a reference voltage, change alternately.

Next, a circuit configuration of the AD converter 130 will be described. The AD converter 130 is a circuit for outputting as a digital pixel signal a comparison result between the pixel signal VSL and a reference voltage. This AD converter 130 includes a pair of capacitive elements 131 and 132, an input transistor 133 and an output transistor 134, which make a pair of N-channel MOS transistors, a pair of switches 135 and 136, transistors 137 and 138, which make a pair of P-channel MOS transistors, and a third current source 139.

In the AD converter 130, the pixel signal VSL is input to the gate of the input transistor 133 through the capacitive element 131. On the other hand, a ground voltage REF_GND, which is the reference voltage, is input to the gate of the output transistor 134 through the capacitive element 132. When the switches 135 and 136 are in an on state, the gate potentials of the input transistor 133 and the output transistor 134 are reset, and the AD converter 130 becomes an auto-zero state accordingly. The sources of the input transistor 133 and the output transistor 134 are commonly connected to the third current source 139.

The transistors 137 and 138 function as a current mirror circuit that performs current control so that a same current flows through the input transistor 133 and the output transistor 134. The gates of the transistors 137 and 138 are connected to each other. The sources thereof are commonly connected to a power supply that supplies a voltage VDDCM. The drain of the transistor 137 is connected to the drain of the input transistor 133, and the drain of the transistor 138 is connected to the drain of the output transistor 134. In the AD converter 130 configured as described above, when the voltage of the pixel signal VSL matches, in other words, crosses the ground voltage REF_GND, a comparison voltage VCO indicating the comparison result is inverted.

The stacked structure of the pixel 20 will now be described with reference to FIGS. 3A and 3B.

FIG. 3A is a perspective view illustrating an example of a two-layer structure of the pixel 20. In FIG. 3A, the pixel 20 is distributed to be arranged on a first substrate 301 and a second substrate 302. The first substrate 301 and the second substrate are semiconductor substrates such as silicon substrates. In FIG. 3A, the second substrate 302 is placed below the first substrate 301, and the two substrates are bonded to each other.

In the two-layer structure illustrated in FIG. 3A, on the first substrate 301, for example, the photoelectric conversion element 211, the transfer transistor 212, the first reset transistor 213, the first amplifier transistor 221, the first switch 222, and the second switch 231 are arranged. With this arrangement, on the second substrate 302, the first current source 223, the circuit elements of the signal holding circuit 230 except for the second switch 231, and the second source follower circuit 240 are arranged. Note that the AD converter 130 may be arranged on the second substrate 302.

Alternatively, the photoelectric conversion element 211, the transfer transistor 212, the first reset transistor 213, the first source follower circuit 220, and the second switch 231 may be arranged on the first substrate 301, and the circuit elements of the signal holding circuit 230 except for the second switch 231, and the second source follower circuit 240 may be arranged on the second substrate 302. Also with this arrangement, the AD converter 130 may be arranged on the second substrate 302.

FIG. 3B is a perspective view illustrating an example of a three-layer structure of the pixel 20. In FIG. 3B, the pixel 20 is distributed to be arranged on a first substrate 301, a second substrate 302, and a third substrate 303. The third semiconductor substrate 3, like the first substrate 301 and the second substrate, is a semiconductor substrate such as a silicon substrate. In FIG. 3B, the third substrate 303 is placed at the bottom layer, and the three substrates are bonded.

In the three-layer structure illustrated in FIG. 3B, on the first substrate 301, for example, the photoelectric conversion element 211 and the transfer transistor 212 are arranged. With this arrangement, on the second substrate 302, the first amplifier transistor 221, the first source follower circuit 220, and the second switch 231 are arranged. In addition, on the third substrate 303, the circuit elements of the signal holding circuit 230 except for the second switch 231, and the second source follower circuit 240 are arranged. With this arrangement, the AD converter 130 may be arranged on the third substrate 303.

Note that the stacked structure of the pixel 20 is not limited to the two-layer structure illustrated in FIG. 3A or the three-layer structure illustrated in FIG. 3B. For example, the first capacitive element 232 and the second capacitive element 233 may be realized using the first substrate 301 and the second substrate 302. In this case, for each of them, a pair of conductors facing each other is arranged on the first substrate 301 and the second substrate 302. The capacitance of each of the first capacitive element 232 and the second capacitive element 233 can be set by adjusting the distance between the corresponding pair of conductors.

FIG. 4 is a timing chart for explaining the operation of the pixel 20 according to the first embodiment. FIG. 4 illustrates the waveforms of the first reset signal RST1, the transfer signal TRG, the second reset signal RST2, the first sample and hold signal S1, the second sample and hold signal S2, the selection signal SEL, the input node V1, the first switching signal SW1, the second switching signal SW2, the ramp signal RAMP, the output node V2, and the comparison voltage VCO. Note that for the output node V2, two voltage waveforms are illustrated, one for the ramp signal RAMP and the other for no ramp signal RAMP.

First, during a period of timing T0 to timing T1, the row selection unit 12 supplies a first reset signal RST1 and a transfer signal TRG both with high level to all pixels 20. As a result, in each pixel 20, the first reset transistor 213 is turned on based on the first reset signal RST1, and the transfer transistor 212 is turned on based on the transfer signal TRG. As a result, all pixels 20 are reset, and accordingly, a global switch period (hereinafter referred to as a GS period) is started in which all pixel rows are exposed for the same period.

At timing T0, the row selection unit 12 also supplies a second reset signal RST2 with high level to all pixels 20. As a result, in each pixel 20, the second reset transistor 236 is turned on, and accordingly, the voltages of the first capacitive element 232 and the second capacitive element 233 are reset to the constant voltage Vreg. Further, at timing T0, the first sample transistor 234 is in an on state based on a first sample and hold signal S1 with high level, while the second sample transistor 235 is in an off state based on a second sample and hold signal S2 with low level. Furthermore, at timing T0, the first switch 222 is in an on state based on a first switching signal SW1 with high level, and the second switch 231 is in an off state based on a second switching signal SW2 with low level.

At timing T2, which is in the middle of the GS period, the first reset transistor 213 is turned on again based on a first reset signal RST1 with high level. At this time, the transfer signal TRG is at low level, and accordingly, the transfer transistor 212 is in an off state. Subsequently, at timing T3 when the first sample and hold signal S1 changes from high level to low level, the voltage level of the reset signal is sampled and held by the first capacitive element 232.

Subsequently, at timing T4 when the transfer transistor 212 is turned on again based on a transfer signal TRG with high level, the second sample and hold signal S2 changes from low level to high level. As a result, the second sample transistor 235 changes from the off state to the on state.

Subsequently, at timing T5 when the second sample and hold signal S2 changes from high level to low level, the voltage level of the data signal corresponding to the amount of charges photoelectrically converted by the photoelectric conversion element 211 is sampled and held in the second capacitive element 233.

At timing T6 when the GS period ends, the first switching signal SW1 changes from high level to low level, and accordingly, the first switch 222 changes from the on state to the off state.

Thereafter, at timing T7, a read-out period in which the reset signal and data signal held in the signal holding circuit 230 are read out is started. During the read-out period, the selection signal SEL is at high level, and accordingly, the selection transistor 242 maintains the on state. In other words, during the read-out period, the reset signal and the data signal are in a state where they can be transmitted to the AD converter 130.

Further, at timing T7, the second switching signal SW2 changes from the off state to the on state, and accordingly, the ramp signal RAMP is supplied to the first capacitive element 232 and the second capacitive element 233. Thus, the ramp signal RAMP is superimposed on each of the reset signal and the data signal.

Subsequently, during a period of timing T7 to timing T8, a second reset signal RST2 with high level is input to the gate of the second reset transistor 236, accordingly the second reset transistor 236 is turned on, and the potential of the output node V2 is reset to the constant voltage Vreg.

Subsequently, during the P-phase period of timing T9 to timing T10, the first sample and hold signal S1 is at a high level. As a result, the first sample transistor 234 is turned on, so that the reset signal on which the ramp signal RAMP is superimposed is read out by the second source follower circuit 240. This reset signal is amplified by the second source follower circuit 240 and transmitted to the AD converter 130 as a pixel signal VSL. In the P-phase period, when the voltage of the pixel signal VSL matches the ground voltage REF_GND of the AD converter 130, the comparison voltage VCO changes from high level to low level.

Subsequently, during the D-phase period of timing T11 to timing T2, the first sample and hold signal S1 becomes a hello level, while the second sample and hold signal S2 becomes high level. As a result, the second sample transistor 235 is turned on, so that the data signal on which the ramp signal RAMP is superimposed is read out by the second source follower circuit 240. This data signal is also amplified by the second source follower circuit 240 and transmitted to the AD converter 130 as a pixel signal VSL. Also in the D-phase period, when the voltage of the pixel signal VSL matches the reference voltage REF_GND of the AD converter 130, the comparison voltage VCO changes from high level to low level. Consequently, the AD converter 130 outputs, as a comparison result, a digital signal having a pulse width corresponding to the voltage level of the pixel signal VSL, specifically, a pulse width corresponding to the magnitude of the signal level.

Note that the second source follower circuit 240 in the present embodiment reads out the reset signal from the signal holding circuit 230 prior to the data signal, but the second source follower circuit 240 may read out the signals in the reverse order. For example, the second switching signal SW2 may be held at high level during the period of timing T9 to timing T10, and the first switching signal SW1 may be held at high level during the period of timing T11 to timing T12. In this case, the second source follower circuit 240 can read out the data signal from the signal holding circuit 230 prior to the reset signal.

FIG. 5A is a voltage waveform diagram illustrating an inversion voltage of an AD converter according to a comparative example. FIG. 5B is a voltage waveform diagram illustrating an inversion voltage of the AD converter 130 according to the first embodiment.

In FIG. 5A, a pixel signal VSL is compared with a ramp signal RAMP. Therefore, the inversion voltage of the AD converter also changes according to the voltage level of the pixel signal VSL. Therefore, an inversion voltage range DR1 required for the AD converter also becomes large.

On the other hand, in the AD converter 130 according to the present embodiment, the first capacitive element 232 and the second capacitive element 233 function as input capacitors for the ramp signal RAMP, so that the ramp signal RAMP is superimposed on the pixel signal VSL. In addition, as illustrated in FIG. 5B, the AD converter 130 according to the present embodiment compares the pixel signal VSL on which the ramp signal RAMP is superimposed with the reference voltage. Therefore, the voltage at which the comparison voltage VCO is inverted is approximately constant regardless of the voltage level of the pixel signal VSL. As a result, an inversion voltage range DR2 required for the AD converter 130 can be made smaller than the inversion voltage range DR1 according to the comparative example. In addition, the inversion voltage range DR2 can be made smaller compared to an inversion voltage range DR3 (see FIG. 4) required for the AD converter 130 under a condition that the pixel signal VSL without the ramp signal RAMP being superimposed on is compared with the reference voltage. This makes it possible to increase the dynamic range of the pixel signal VSL without being limited by the AD converter 130.

Second Embodiment

FIG. 6 is a diagram illustrating a circuit configuration of a pixel 20a and an AD converter 130a of an imaging device according to a second embodiment. Similar constituent elements to those in the first embodiment described above will be designated by the same reference signs and detailed descriptions thereof will be omitted.

As illustrated in FIG. 6, in the present embodiment, the pixel 20a includes a photoelectric conversion circuit 210a, a first source follower circuit 220a, a signal holding circuit 230a, a second source follower circuit 240a, and a signal generation circuit 250a. The circuit configuration of each circuit is the same as that in the first embodiment, and thus, the description thereof will be omitted. On the other hand, the circuit configuration of the AD converter 130a is different from that of the first embodiment. Therefore, the circuit configuration of the AD converter 130a will be described.

The AD converter 130a includes the capacitive element 131, an input transistor 133a configured by an N-channel MOS transistor, an output transistor 134a configured by a P-channel MOS transistor, the switch 135, and the third current source 139.

A bias signal Vbias is input from the row selection unit 12 to the gate of the input transistor 133a via the corresponding pixel control line 31. The voltage of the bias signal Vbias is set to a voltage for turning on the input transistor 133a. The drain of the input transistor 133a is connected to a power source that supplies a voltage VDDCM, and the source thereof is connected to the source of the output transistor 134a.

A pixel signal VSL is input to the gate of the output transistor 134a through the capacitive element 131. The source of the output transistor 134a is connected to the source of the input transistor 133a, and the drain thereof is connected to the third current source 139. The switch 135 is provided between the gate and drain of the output transistor 134a. When the switch 135 is in an on state, the gate potential of the output transistor 134a is reset, and the AD converter 130a becomes an auto-zero state accordingly.

In the AD converter 130a configured as described above, the pixel signal VSL is compared with the bias signal Vbias. Consequently, the comparison voltage VCO is inverted when the voltage of the pixel signal VSL becomes higher than the voltage of the bias signal Vbias or lower than the voltage of the bias signal Vbias.

Similarly to the first embodiment, in the present embodiment described above, the signal generation circuit 250a supplies a ramp signal RAMP to the signal holding circuit 230 when the second source follower circuit 240a reads out the pixel signal VSL. As a result, the pixel signal VSL on which the ramp signal RAMP is superimposed is input to the AD converter 130a. Therefore, in the AD converter 130a, the voltage at which the comparison voltage VCO is inverted is approximately constant regardless of the voltage level of the pixel signal VSL. Thus, it is possible to increase the dynamic range of the pixel signal VSL without being limited by the AD converter 130.

Third Embodiment

FIG. 7 is a diagram illustrating a circuit configuration of a pixel 20b and an AD converter 130b of an imaging device according to a third embodiment. Similar constituent elements to those in the first embodiment described above will be designated by the same reference signs and detailed descriptions thereof will be omitted.

As illustrated in FIG. 7, in the present embodiment, the pixel 20b includes a photoelectric conversion circuit 210b, a first source follower circuit 220b, a signal holding circuit 230b, a second source follower circuit 240b, and a signal generation circuit 250b. The circuit configuration of each circuit is the same as that in the first embodiment, and thus, the description thereof will be omitted. On the other hand, the circuit configuration of the AD converter 130b is different from that of the first embodiment. Therefore, the circuit configuration of the AD converter 130b will be described.

The AD converter 130b includes the capacitive element 131, an input transistor 133b configured by a P-channel MOS transistor, an output transistor 134b configured by a P-channel MOS transistor, the switch 135, and the third current source 139.

The ground voltage REF_GND is input to the gate of the input transistor 133b through the capacitive element 131. The source of the input transistor 133b is connected to the source of the selection transistor 242 of the second source follower circuit 240, and the drain thereof is connected to the second current source 243 of the second source follower circuit 240. In other words, the input transistor 133b is provided between the selection transistor 242 and the second current source 243.

The switch 135 is provided between the gate and drain of the input transistor 133b. When the switch 135 is in an on state, the gate potential of the input transistor 133b is reset, and the AD converter 130b becomes an auto-zero state accordingly.

The gate of the output transistor 134b is connected to the drain of the input transistor 133b. The source of the output transistor 134b and the source of the input transistor 133b are commonly connected to the source of the selection transistor 242 of the second source follower circuit 240. The drain of the output transistor 134b is connected to the third current source 139. The drain voltage of the output transistor 134b corresponds to a comparison voltage VCO that indicates whether or not a difference between the pixel signal VSL input to the source and a drain voltage Vd of the input transistor 133b input to the gate exceeds a predetermined threshold voltage.

In the AD converter 130b configured as described above, the input transistor 133b compares the pixel signal VSL and the ground voltage REF_GND. Consequently, the drain voltage Vd is inverted at the timing when the voltage of the pixel signal VSL almost matches the ground voltage REF_GND. Accordingly, the comparison voltage VCO is also inverted.

|

Similarly to the first embodiment, in the present embodiment, the ramp signal RAMP is supplied from the signal generation circuit 250 to the first capacitive element 232 and the second capacitive element 233 during the read-out period. Therefore, the inversion range of the comparison voltage VCO can be made smaller regardless of the voltage level of the pixel signal VSL. Therefore, it is possible to increase the dynamic range of the pixel signal VSL.

In the AD converter 130b of the present embodiment, the output transistor 134b is provided at a stage subsequent to the input transistor 133b, and the source and drain of the input transistor 133b are connected to the source and gate of the output transistor 134b. With this connection, the drain-source voltage of the input transistor 133b is input as the gate-source voltage of the output transistor 134b.

Regarding the voltage of the pixel signal VSL, the voltage level of the data signal is lower than the voltage level of the reset signal. The amount of voltage drop of this pixel signal VSL is the same as the amount of voltage drop of the drain voltage Vd of the input transistor 133b. Since the drain-source voltage of the input transistor 133b corresponds to the gate-source voltage of the output transistor 134b, the inversion timing of the comparison voltage VCO is the ideal timing at which the voltage of the pixel signal VSL substantially matches the ground voltage REF_GND. This prevents an error in the inversion timing, making it possible to reduce the linearity error and offset and improve the image quality.

Fourth Embodiment

FIG. 8 is a diagram illustrating a circuit configuration of a pixel 20c of an imaging device according to a fourth embodiment. Similar constituent elements to those in the first embodiment described above will be designated by the same reference signs and detailed descriptions thereof will be omitted. Note that FIG. 8 also illustrates an AD converter 130c, but the configuration of this AD converter 130c may be any one of the AD converters 130 to 130b described in the above embodiments.

In the present embodiment, as illustrated in FIG. 8, the pixel 20c includes a photoelectric conversion circuit 210c, a first source follower circuit 220c, a signal holding circuit 230c, a second source follower circuit 240c, and a signal generation circuit 250c. The configurations of the circuits of the pixel 20c except for the signal holding circuit 230c are the same as those in the first embodiment, and thus, the description thereof will be omitted. The signal holding circuit 230c according to the present embodiment will be described below.

As illustrated in FIG. 8, the signal holding circuit 230c further includes a third reset transistor 238 in addition to the constituent elements of the signal holding circuit 230 described in the first embodiment. The third reset transistor 238 is an element for resetting the potential of the input node V1, and is configured by, for example, an N-channel MOS transistor.

A third reset signal RSTa is input to the gate of the third reset transistor 238 from the row selection unit 12 via the corresponding pixel control line 31. The drain thereof is connected to a power supply that supplies a voltage VDD3, and the source thereof is connected to the input node V1. The voltage VDD3 is a potential lower than the power supply voltage VDD1.

FIG. 9 is a timing chart for explaining the operation of the pixel according to the fourth embodiment. Here, only the points different from the first embodiment, that is, only the operation related to the third reset signal RSTa, will be described, and the other operations will be omitted because they are the same as the first embodiment.

First, during a GS period in which all pixels 20c are exposed, a third reset signal RSTa with high level is supplied to the gate of the third reset transistor 238 at the same timing as the first reset signal RST1. Specifically, the third reset signal RSTa changes from low level to high level at timing TO and timing T2. When the third reset transistor 238 is turned on based on the third reset signal RSTa with high level, the potential of the input node V1 is reset to the voltage VDD3.

Next, during a read out period in which the reset signal and data signal are read out from the signal holding circuit 230, the third reset signal RSTa is always at high level, like the first reset signal RST1. Specifically, the third reset signal RSTa is always at high level during a period of timing T7 to timing T12. Therefore, during the read-out period, the potential of the input node V1 is held at the voltage VDD3.

Similarly to the first embodiment, in the present embodiment, the ramp signal RAMP is supplied from the signal generation circuit 250 to the first capacitive element 232 and the second capacitive element 233 during the read-out period. Therefore, the inversion range of the comparison voltage VCO can be made smaller regardless of the voltage level of the pixel signal VSL. Therefore, it is possible to expand the dynamic range of the pixel signal VSL.

In the first embodiment, the reset potential of the input node V1 is a voltage level defined by the first source follower circuit 220 (the power supply voltage VDD1—the gate-source voltage of the amplifier transistor). On the other hand, in the present embodiment, the reset potential of the input node V1 is set to a voltage level (voltage VDD3) different from the voltage level defined by the first source follower circuit 220. Thus, by setting the voltage VDD3 to any value according to an external input or the like, the reset voltage of the input node V1 can be set to any value, so that the reset operation can be actively controlled.

Fifth Embodiment

FIG. 10 is a diagram illustrating a circuit configuration of a pixel 20d of an imaging device according to a fifth embodiment. Similar constituent elements to those in the first embodiment described above will be designated by the same reference signs and detailed descriptions thereof will be omitted. Note that FIG. 10 also illustrates an AD converter 130d, but the configuration of this AD converter 130d may be any one of the AD converters 130 to 130b described in the above embodiments.

In the present embodiment, as illustrated in FIG. 10, the pixel 20d includes a photoelectric conversion circuit 210d, a first source follower circuit 220d, a signal holding circuit 230d, a second source follower circuit 240d, and a signal generation circuit 250250d. The configurations of the circuits of the pixel 20d except for the first source follower circuit 220d are the same as those in the first embodiment, and thus, the description thereof will be omitted. The first source follower circuit 220d according to the present embodiment will be described below.

As illustrated in FIG. 10, the first source follower circuit 220d includes the first amplifier transistor 221, a first selection transistor 224, a bias cut switch 225, and the first current source 223, and these elements are connected in series.

The first selection transistor 224 is an element for switching whether or not to transmit the output signal of the first amplifier transistor 221 to the signal holding circuit 230, and is configured by, for example, an N-channel MOS transistor. A first selection signal SEL1 is input to the gate of the first selection transistor 224 from the row selection unit 12 via the corresponding pixel control line 31. The drain thereof is connected to the source of the first amplifier transistor 221, and the source thereof is connected to the signal holding circuit 230 and the bias cut switch 225. The first selection transistor 224 is disposed between the first amplifier transistor 221 and the signal holding circuit 230d. Therefore, when the first selection transistor 224 is turned on based on a first selection signal SEL1 with high level, the output signal of the first amplifier transistor 221 is transmitted to the signal holding circuit 230. Conversely, when the first selection transistor 224 is turned off based on a first selection signal SEL1 with low level, the output signal of the first amplifier transistor 221 is not transmitted to the signal holding circuit 230d.

The bias cut switch 225 is an element for reducing power consumption of the first source follower circuit 220d, and is configured by, for example, an N-channel MOS transistor. A bias cut signal SW0 is input to the gate of the bias cut switch 225 from the row selection unit 12 via the corresponding pixel control line 31. The drain thereof is connected to the source of the first switch 222, and the source is connected to the first current source 223. The bias cut switch 225 is disposed between the first switch and first current source 223. Therefore, when the bias cut switch 225 is turned on based on a bias cut signal SW0 with high level, current is supplied from the first current source 223. Conversely, when the bias cut switch 225 is turned off based on a bias cut signal SW0 with low level, the current supply from the first current source 223 is cut off.

FIG. 11 is a timing chart for explaining the operation of the pixel 20d according to the fifth embodiment. For the sake of simplicity of description, FIG. 11 illustrates the waveforms of only the first reset signal RST1, the transfer signal TRG, the second reset signal RST2, the bias cut signal SW0, the first selection signal SEL1, and the input node V1. The waveforms of the first sample and hold signal S1, the second sample and hold signal S2, the selection signal SEL, the second switching signal SW2, the ramp signal RAMP, the output node V2, and the comparison voltage VCO are not illustrated in FIG. 11. Here, only the points different from the first embodiment, that is, only the operations related to the first selection signal SEL1 and the bias cut signal SW0, will be described, and the other operations will be omitted because they are the same as the first embodiment.

First, in a GS period in which all pixels 20d are exposed, a first selection signal SEL1 with high level is constantly supplied to the gate of the first selection transistor 224. Therefore, during a period of timing T1 to timing T6, the first selection transistor 224 is always in an on state, so that the output signal of the first amplifier transistor 221 can be transmitted to the signal holding circuit 230.

During the GS period, a bias cut signal SW0 with high level is constantly supplied to the gate of the bias cut switch 225. Accordingly, the bias cut switch 225 is also always in an on state, and the current supplied from the first current source 223 flows through the first source follower circuit 220d.

At timing T6 when the GS period ends, the first selection signal SEL1 and the bias cut signal SW0 change from high level to low level. Accordingly, the first selection transistor 224 and the bias cut switch 225 change from the on state to the off state.

Next, just before timing T7 when a read-out period in which the reset signal and the data signal are read out from the signal holding circuit 230d starts, the bias cut signal SW0 changes from low level to high level. After that, the bias cut signal SW0 maintains high level until timing T12 when the read-out period ends. On the other hand, the first selection signal SEL1 maintains low level during the read-out period.

Similarly to the first embodiment, according to the present embodiment described above, the ramp signal RAMP is supplied from the signal generation circuit 250 to the first capacitive element 232 and the second capacitive element 233 during the read-out period. Therefore, the inversion range of the comparison voltage VCO can be made smaller regardless of the voltage level of the pixel signal VSL. Therefore, it is possible to expand the dynamic range of the pixel signal VSL.

In the present embodiment, the bias cut switch 225 being disposed in a current supply path of the first current source 223 makes it possible to temporarily cut off the current supply from the first current source 223. Therefore, the power consumption of the first source follower circuit 220d can be reduced. In the present embodiment, the bias cut signal SW0 is at low level between the GS period and the read-out period. However, the bias cut signal SW0 may be always at low level even during the read-out period. In this case, since the current supply from the first current source 223 is cut off during the read-out period, the power consumption of the first source follower circuit 220d can be further reduced.

Sixth Embodiment

FIG. 12 is a diagram illustrating a circuit configuration of a pixel 20e of an imaging device according to a sixth embodiment. Similar constituent elements to those in the first embodiment described above will be designated by the same reference signs and detailed descriptions thereof will be omitted. Note that FIG. 12 also illustrates an AD converter 130e, but the configuration of this AD converter 130e may be any one of the AD converters 130 to 130b described in the above embodiments.

In the present embodiment, as illustrated in FIG. 12, the pixel 20e includes a photoelectric conversion circuit 210e, a first source follower circuit 220e, a signal holding circuit 230e, a second source follower circuit 240e, and a signal generation circuit 250e. The configuration of the circuits in the pixel 20e except for the first source follower circuit 220e is the same as that in the first embodiment, and thus, the description thereof will be omitted. The first source follower circuit 220e according to the present embodiment will be described below.

As illustrated in FIG. 12, the first source follower circuit 220e further includes the first selection transistor 224 and the bias cut switch 225, which are described in the fifth embodiment, in addition to the constituent elements of the first source follower circuit 220 described in the first embodiment.

FIG. 13 is a timing chart for explaining the operation of the pixel 20e according to the sixth embodiment. For the sake of simplicity of description, FIG. 13 illustrates the waveforms of only the first reset signal RST1, the transfer signal TRG, the second reset signal RST2, the bias cut signal SW0, the first selection signal SEL1, and the first switching signal SW1, and the input node V1. The waveforms of the first sample and hold signal S1, the second sample and hold signal S2, the selection signal SEL, the second switching signal SW2, the ramp signal RAMP, the output node V2, and the comparison voltage VCO are not illustrated in FIG. 13.

Here, only the points different from the first embodiment, that is, only the operations related to the first selection signal SEL1 and the bias cut signal SW0, will be described, and the other operations will be omitted because they are the same as the first embodiment.

First, in a GS period in which all pixels 20e are exposed, a first selection signal SEL1 with high level is constantly supplied to the gate of the first selection transistor 224. During the GS period, the first switching signal SW1 is also constantly supplied to the gate of the first switch 222. Therefore, during a period of timing T1 to timing T6, the first selection transistor 224 and the first switch 222 are always in an on state, so that the output signal of the first amplifier transistor 221 can be transmitted to the signal holding circuit 230.

During the GS period, a bias cut signal SW0 with high level is constantly supplied to the gate of the bias cut switch 225. Accordingly, the bias cut switch 225 is also always in an on state, and the current supplied from the first current source 223 flows through the first source follower circuit 220a.

At timing T6 when the GS period ends, the first selection signal SEL1 maintains high level, while the first switching signal SW1 and the bias cut signal SW0 change from high level to low level. Accordingly, the first switch 222 and the bias cut switch 225 change from the on state to the off state.

Next, just before timing T7 when a read-out period in which the reset signal and the data signal are read out from the signal holding circuit 230e starts, the bias cut signal SW0 changes from low level to high level. After that, the bias cut signal SW0 maintains high level until timing T12 when the read-out period ends. During the read-out period, the first selection signal SEL1 maintains high level, while the first switching signal SW1 maintains low level.

Similarly to the first embodiment, according to the present embodiment described above, the ramp signal RAMP is supplied from the signal generation circuit 250 to the first capacitive element 232 and the second capacitive element 233 during the read-out period. Therefore, the inversion range of the comparison voltage VCO can be made smaller regardless of the voltage level of the pixel signal VSL. Therefore, it is possible to increase the dynamic range of the pixel signal VSL.

In the present embodiment, the first selection transistor 224 and the first switch 222 are arranged in a signal transmission circuit that includes the first amplifier transistor 221 to the signal holding circuit 230e, and these elements are independently controlled. This allows a pixel selection control line and a sample and hold pulse control line to be wired separately, so that by laying out only the sample and hold pulse control line on a separate wiring layer, a sample and hold pulse can be optimized to be driven with an appropriate load.

In the present embodiment, as in the fifth embodiment, the bias cut switch 225 being disposed in a current supply path of the first current source 223 makes it possible to temporarily cut off the current supply from the first current source 223. Therefore, the power consumption of the first source follower circuit 220e can be reduced. Note that the bias cut signal SW0 may be always at low level even during the read-out period. In this case, since the current supply from the first current source 223 is cut off during the read-out period, the power consumption of the first source follower circuit 220e can be further reduced.

Seventh Embodiment

FIG. 14 is a diagram illustrating a circuit configuration of a pixel 20f of an imaging device according to a seventh embodiment. Similar constituent elements to those in the first embodiment described above will be designated by the same reference signs and detailed descriptions thereof will be omitted. Note that FIG. 14 also illustrates an AD converter 130f, but the configuration of this AD converter 130f may be any one of the AD converters 130 to 130b described in the above embodiments.

In the present embodiment, as illustrated in FIG. 14, the pixel 20f includes a photoelectric conversion circuit 210f, a first source follower circuit 220f, a signal holding circuit 230f, a second source follower circuit 240f, and a signal generation circuit 250f. In the pixel 20e, the first source follower circuit 220f includes the first selection transistor 224 and the bias cut switch 225 instead of the first switch 222, as described in the fifth embodiment. Note that the first source follower circuit 220f may have the circuit configuration described in other embodiments. The second source follower circuit 240f does not include the second switch 231.

The pixel 20f according to the present embodiment further includes a third source follower circuit 260 disposed between the signal generation circuit 250 and the signal holding circuit 230. The third source follower circuit 260 includes an amplifier transistor 261 and a third selection transistor 262 connected in series to the amplifier transistor 261.

The amplifier transistor 261 is an element for amplifying a ramp signal RAMP generated by the signal generation circuit 250, and is configured by, for example, an N-channel MOS transistor. The ramp signal RAMP is input to the gate of the amplifier transistor 261. The drain thereof is connected to the positive power supply that supplies the power supply voltage VDD1, and the source thereof is connected to the third selection transistor 262.

The third selection transistor 262 is disposed between the amplifier transistor 261 and the signal holding circuit 230f, and is configured by, for example, an N-channel MOS transistor. A third selection signal SEL3 is input to the gate of the third selection transistor 262 from the row selection unit 12 via the corresponding pixel control line 31. The drain thereof is connected to the source of the amplifier transistor 261, and the source thereof is connected to the input node V1 of the signal holding circuit 230. When the third selection transistor 262 is turned on based on a third selection signal SEL3 with high level, the ramp signal RAMP amplified by the amplifier transistor 261 is supplied to each of the first capacitive element 232 and the second capacitive elements 233 via the input node V1 of the signal holding circuit 230.

FIG. 15 is a timing chart for explaining the operation of the pixel 20f according to the seventh embodiment. Here, only the points different from the first embodiment and the fifth embodiment, that is, the operation related to the third selection signal SEL3, will be described, and the other operations will be omitted because they are the same as the first embodiment.

First, in a GS period in which all pixels 20f are exposed, a third selection signal SEL3 with low level is constantly supplied to the gate of the third selection transistor 262. Therefore, during a period of timing T1 to timing T6, the third selection transistor 262 is always in an off state, so that the ramp signal RAMP amplified by the amplifier transistor 261 is not transmitted to the signal holding circuit 230.

Next, at timing T7 when a read-out period in which the reset signal and the data signal are read out from the signal holding circuit 230f starts, the third selection signal SEL3 changes from low level to high level. As a result, the third selection transistor 262 changes from the off state to the on state, so that the ramp signal RAMP amplified by the amplifier transistor 261 is transmitted to the signal holding circuit 230. After that, the third selection signal SEL3 maintains high level until timing T12 when the read-out period ends.

Similarly to the first embodiment, according to the present embodiment described above, the ramp signal RAMP is supplied from the signal generation circuit 250 to the first capacitive element 232 and the second capacitive element 233 during the read-out period. Therefore, the inversion range of the comparison voltage VCO can be made smaller regardless of the voltage level of the pixel signal VSL. Therefore, it is possible to increase the dynamic range of the pixel signal VSL.

According to the present embodiment, the ramp signal RAMP amplified by the amplifier transistor 261 is supplied to the signal holding circuit 230f during the read-out period. Therefore, it is possible to improve the driving power.

Eighth Embodiment

FIG. 16 is a diagram illustrating a circuit configuration of a pixel 20g of an imaging device according to an eighth embodiment. Similar constituent elements to those in the first embodiment described above will be designated by the same reference signs and detailed descriptions thereof will be omitted. The pixel 20g includes a photoelectric conversion circuit 210g, a first source follower circuit 220g, a signal holding circuit 230g, a second source follower circuit 240g, and a signal generation circuit 250g.

In the present embodiment, the signal generation circuit 250g generates a first ramp signal RAMP1 and a second ramp signal RAMP2. The first ramp signal RAMP1 corresponds to the slope portion of the ramp signal RAMP described in the first embodiment. On the other hand, the second ramp signal RAMP2 corresponds to the offset portion of the ramp signal RAMP. In other words, in the present embodiment, the signal generation circuit 250 separates the ramp signal RAMP described in the first embodiment into the first ramp signal RAMP1 and the second ramp signal RAMP2. The first ramp signal RAMP1 is supplied to the first capacitive element 232 and the second capacitive element 233 through the second switch 231. The second ramp signal RAMP2 is supplied to the AD converter 130g.

Similar to the AD converter 130b illustrated in FIG. 7, the AD converter 130g shares the second current source 243 with the second source follower circuit 240g. On the other hand, the AD converter 130g differs from the AD converter 130b in that the second ramp signal RAMP2 is input to the gate of the input transistor 133b through the capacitive element 131.

In the pixel 20 according to the first embodiment, the ramp signal RAMP has an offset before the slope portion in order to ensure that the comparison voltage VCO is inverted in the AD converter 130 and have linearity. Thus, the ramp signal RAMP is composed of the slope portion and the offset portion. However, if a step in the offset portion becomes gentle in the signal line 32 due to the influence of the large time constant of the signal line 32, it will be necessary to wait for a settling for the step. When a settling period ts1 for the reset signal and a settling period ts2 for the data signal are made longer, the total time required for analog-to-digital conversion in the AD converter 130 increases accordingly. Consequently, the frame rate is reduced, and the average power, which is a power consumption averaged over time, increases.

Therefore, in the pixel 20 according to the present embodiment, for the ramp signal RAMP composed of the slope portion and the offset portion, the offset portion is separated from the ramp signal RAMP and supplied to the gate of the input transistor 133b through the capacitive element 131.

FIG. 17 is a timing chart for explaining the operation of the imaging device according to the eighth embodiment. Here, only the points different from the first embodiment, that is, only the operations related to the first ramp signal RAMP1 and the second ramp signal RAMP2, will be described, and the other operations will be omitted because they are the same as the first embodiment.

First, during a GS period in which all pixels 20g are exposed, the second switching signal SW2 is at low level, and accordingly, the second switch 231 is in an off state. Therefore, the first ramp signal RAMP1 is not supplied to the first capacitive element 232 and the second capacitive element 233. During the GS period, the signal generation circuit 250 does not supply the second ramp signal RAMP2 to the gate of the input transistor 133b.

Next, just before timing T7 when a read-out period in which the reset signal and the data signal are read out from the signal holding circuit 230g starts, the second switching signal SW2 changes from low level to high level, and accordingly, the second switch 231 changes from the off state to the on state. Thus, the first ramp signal RAMP1 is supplied to the first capacitive element 232 and the second capacitive element 233. At the same time, the signal generation circuit 250 supplies the second ramp signal RAMP2 to the gate of the input transistor 133b.

In the present embodiment, although the first ramp signal RAMP1, which is the slope portion, is superimposed on the pixel signal VSL, the step in the offset portion is not superimposed on the pixel signal VSL. Therefore, the waveform on the signal line 32 does not become gentle due to the influence of the large time constant of the signal line 32, resulting in no need to wait for a settling for the step. The gate-source voltage of the input transistor 113b, which is a P-channel MOS transistor, is a value obtained by subtracting a voltage VRAMP2 of the second ramp signal RAMP2 from a voltage VRAMP1 of the first ramp signal RAMP1. Since this subtraction value is the same as the voltage of the ramp signal RAMP described in the first embodiment, the same output as that in the first embodiment can be obtained in terms of circuit operation.

According to the present embodiment described above, the first ramp signal RAMP1 corresponding to the slope portion of the ramp signal RAMP is supplied to the first capacitive element 232 and the second capacitive element 233, and is superimposed on the pixel signal VSL. As a result, the inversion potential of the comparison voltage VCO can be kept constant regardless of the level of the pixel signal VSL. Consequently, it is possible to increase the dynamic range of the pixel signal VSL.

In addition, in the present embodiment, the second ramp signal RAMP2 corresponding to the offset portion of the ramp signal RAMP is not affected by the time constant of the signal line 32, so that the settling period ts1 of the reset signal and the settling period ts2 of the data signal can be shortened. This makes it possible to suppress a decrease in frame rate and an increase in power consumption.

Ninth Embodiment

FIG. 18 is a diagram illustrating a circuit configuration of a pixel 20h of an imaging device according to a ninth embodiment. Similar constituent elements to those in the first embodiment described above will be designated by the same reference signs and detailed descriptions thereof will be omitted. In the present embodiment, the pixel 20*h* includes a photoelectric conversion circuit 210*h*, a first source follower circuit 220*h*, a signal holding circuit 230*h*, a second source follower circuit 240*h*, a signal generation circuit 250*h*, and a switching transistor 270. Note that FIG. 18 also illustrates an AD converter 130*h*, but the configuration of this AD converter 130*h* may be any one of the AD converters 130 to 130*b* described in the above embodiments.

The photoelectric conversion circuit 210*h* includes the photoelectric conversion element 211, the transfer transistor 212, the first reset transistor 213, and a double conversion gain transistor 214. In other words, the photoelectric conversion circuit 210*h* further includes the double conversion gain transistor 214 in addition to the constituent elements of the photoelectric conversion circuit 210 described in the first embodiment.

The double conversion gain transistor 214 is disposed between the first reset transistor 213 and the floating diffusion FD, and is configured by, for example, an N-channel MOS transistor. A double conversion gain control signal DCG is input to the gate of the double conversion gain transistor 214 from the row selection unit 12 via the corresponding pixel control line 31. The drain of the double conversion gain transistor 214 is connected to the source of the first reset transistor 213, and the source thereof is connected to the floating diffusion FD.

The first source follower circuit 220*h* has the same circuit configuration as the first source follower circuit 220 described in the first embodiment. Note that in the first source follower circuit 220*h*, the first current source 223 is configured by an N-channel MOS transistor.

The signal holding circuit 230*h* includes a first capacitive element 232, a second capacitive element 233, and a second reset transistor 236. One end of each of the first capacitive element 232 and the second capacitive element 233 is commonly connected to the input node V1. The other end of the first capacitive element 232 is connected to the signal generation circuit 250*h*, and the other end of the second capacitive element 233 is connected to the output node V2. The second reset transistor 236 has the same arrangement as that in the first embodiment, and thus, the description thereof will be omitted.

The second source follower circuit 240*h* includes the second amplifier transistor 241 and the selection transistor 242. The arrangement of each transistor is the same as that in the first embodiment, and thus, the description thereof will be omitted.

The signal generation circuit 250*h* generates and outputs a ramp signal RAMP composed of a slope portion and an offset portion. The ramp signal RAMP is supplied to the first capacitive element 232 and also to the second capacitive element 233 through the first capacitive element 232.

The switching transistor 270 is configured by, for example, an N-channel MOS transistor disposed between the first amplifier transistor 221 and the AD converter 130*h*. A selection signal SEL2 is input to the gate of the switching transistor 270 from the row selection unit 12 via the corresponding pixel control line 31. The drain of the switching transistor 270 is connected to the source of the first amplifier transistor 221, and the source thereof is connected to the AD converter 130*h*. When the switching transistor 270 is turned on based on a selection signal SEL2 with high level, the signal amplified by the first amplifier transistor 221 is directly transmitted to the AD converter 130*h* without passing through the signal holding circuit 230*h* and the second source follower circuit 240*h*.

In the pixel 20*h* configured as described above, when the second source follower circuit 240*h* reads out the reset signal and data signal held in the signal holding circuit 230*h* in order, the signal generation circuit 250*h* supplies the ramp signal RAMP to the signal holding circuit 230*h*. Thus, the ramp signal RAMP is superimposed on the pixel signal VSL. As a result, it is possible to increase the dynamic range of the pixel signal VSL.

Tenth Embodiment

FIG. 19 is a diagram illustrating a circuit configuration of a pixel 20*i* of an imaging device according to a tenth embodiment. Similar constituent elements to those in the first embodiment described above will be designated by the same reference signs and detailed descriptions thereof will be omitted. In the present embodiment, the pixel 20*i* includes a photoelectric conversion circuit 210*i*, a first source follower circuit 220*i*, a signal holding circuit 230*i*, a second source follower circuit 240*i*, and a signal generation circuit 250*i*. Note that FIG. 19 also illustrates an AD converter 130*i*, but the configuration of this AD converter 130*i* may be any one of the AD converters 130 to 130*b* described in the above embodiments.

In the pixel 20*i*, the configurations of the photoelectric conversion circuit 210*i*, the first source follower circuit 220*i*, and the signal generation circuit 250*i* are the same as those in the first embodiment, and thus, the description thereof will be omitted. The signal holding circuit 230*i* and the second source follower circuit 240*i* are the same as those in the ninth embodiment described above, and thus, the description thereof will be omitted.

In the pixel 20*i* configured as described above, when the second source follower circuit 240*i* reads out the reset signal and data signal held in the signal holding circuit 230*i* in order, the signal generation circuit 250*i* supplies the ramp signal RAMP to the signal holding circuit 230*i*. Thus, the ramp signal RAMP is superimposed on the pixel signal VSL. As a result, it is possible to increase the dynamic range of the pixel signal VSL.

Eleventh Embodiment

FIG. 20 is a diagram illustrating a circuit configuration of a pixel 20*j* of an imaging device according to an eleventh embodiment. Similar constituent elements to those in the first embodiment described above will be designated by the same reference signs and detailed descriptions thereof will be omitted. In the present embodiment, the pixel 20*j* includes a photoelectric conversion circuit 210*j*, a first source follower circuit 220*j*, a signal holding circuit 230*j*, a second source follower circuit 240*j*, and a signal generation circuit 250*j*. The configurations of the photoelectric conversion circuit 210*j*, the first source follower circuit 220*j*, and the signal generation circuit 250*j* are the same as those in the first embodiment, and thus, the description thereof will be omitted. Note that FIG. 20 also illustrates an AD converter 130*j*, but the configuration of this AD converter 130*j* may be any one of the AD converters 130 to 130*b* described in the above embodiments.

The signal holding circuit 230*j* includes a first capacitive element 232, a second capacitive element 233, a sample transistor 237*a*, and a sample transistor 237*b*. One end of the first capacitive element 232 is connected to the input node V1 through the sample transistor 237*a*, and one end of the second capacitive element 233 is connected to the input node V1 through the sample transistor 237*b*. The other end of each of the first capacitive element 232 and the second capacitive element 233 is connected to the signal generation circuit 250*j*.

The sample transistor 237*a* is disposed between the input node V1 and one end of the first capacitive element 232, and is configured by, for example, an N-channel MOS transistor. A sample and hold signal Φ1 is input to the gate of the sample transistor 237*a* from the row selection unit 12 via the corresponding pixel control line 31. The drain of the sample transistor 237*a* is connected to the input node V1, and the source thereof is connected to one end of the first capacitive element 232. When the sample transistor 237*a* is turned on based on a sample and hold signal Φ1 with high level, the voltage of the reset signal is held in the first capacitive element 232.

The sample transistor 237*b* is disposed between the input node V1 and one end of the second capacitive element 233, and is configured by, for example, an N-channel MOS transistor. A sample and hold signal Φ2 is input to the gate of the sample transistor 237*b* from the row selection unit 12 via the corresponding pixel control line 31. The drain of the sample transistor 237*b* is connected to the input node V1, and the source thereof is connected to one end of the second capacitive element 233. When the sample transistor 237*b* is turned on based on a sample and hold signal Φ2 with high level, the voltage of the data signal is held in the second capacitive element 233.

The second source follower circuit 240*j* includes a second amplifier transistor 241*a*, a transfer transistor 242*a*, a second amplifier transistor 241*b*, and a transfer transistor 242*b*. The second amplifier transistor 241*a* amplifies the reset signal held in the first capacitive element 232. The transfer transistor 242*a* is turned on or off according to the level of a selection signal SELa input from the row selection unit 12 via the corresponding pixel control line 31.

The second amplifier transistor 241*b* amplifies the data signal held in the second capacitive element 233. The transfer transistor 242*b* is turned on or off according to the level of a selection signal SELb input from the row selection unit 12 via the corresponding pixel control line 31.

In the pixel 20*j* configured as described above, the sample transistor 237*a* and the sample transistor 237*b* are turned on in order during a GS period in which all pixels 20*j* are exposed. Thus, the reset signal and the data signal are held in the first capacitive element 232 and the second capacitive element 233 in order.

During a read-out period in which the reset signal and the data signal are read out from the signal holding circuit 230*j*, the signal generation circuit 250*j* supplies a ramp signal RAMP to each of the first capacitive element 232 and the second capacitive element 233. Accordingly, a pixel signal VSL1, which is an amplified reset signal on which the ramp signal RAMP is superimposed, and a pixel signal VSL2, which is an amplified data signal on which the ramp signal RAMP is superimposed, are input to the AD converter 130*j* in order. Since the ramp signal RAMP is superimposed on each of the pixel signal VSL1 and the pixel signal VSL2, it is possible to increase the dynamic range of the pixel signal VSL.

Twelfth Embodiment

FIG. 21 is a diagram illustrating a circuit configuration of a pixel 20*k* of an imaging device according to a twelfth embodiment. Similar constituent elements to those in the first embodiment described above will be designated by the same reference signs and detailed descriptions thereof will be omitted. In the present embodiment, the pixel 20*k* includes a photoelectric conversion circuit 210*k*, a first source follower circuit 220*k*, a signal holding circuit 230*k*, a second source follower circuit 240*k*, and a signal generation circuit 250*k*. Note that FIG. 21 also illustrates an AD converter 130*k*, but the configuration of this AD converter 130*k* may be any one of the AD converters 130 to 130*b* described in the above embodiments.

The circuit configuration of the pixel 20*k* except for the signal holding circuit 230*k* is the same as that in the first embodiment, and thus, the description thereof will be omitted. The signal holding circuit 230*k* will be described below. The signal holding circuit 230*k* includes a first capacitive element 232, a second capacitive element 233, and a sample transistor 239.

One end of the first capacitive element 232 is connected to the input node V1 through the sample transistor 239, and the other end thereof is connected to the signal generation circuit 250*k*. One end of the second capacitive element 233 is directly connected to the input node V1, and the other end thereof is connected to the signal generation circuit 250*k*. The sample transistor 239 is disposed between one end of the first capacitive element 232 and one end of the second capacitive element 233, and is configured by, for example, an N-channel MOS transistor. A sample and hold signal Φ3 is input to the gate of the sample transistor 239 via the corresponding pixel control line 31. The drain of the sample transistor 239 is connected to the input node V1, and the source thereof is connected to the output node V2.

In the pixel 20*k* configured as described above, when the sample transistor 239 is turned on based on a sample and hold signal Φ3 with high level during a GS period in which all pixels 20*k* are exposed, the voltage of the reset signal is held in the first capacitive element 232. After that, when the sample and hold signal Φ3 changes from high level to low level and the sample transistor 239 changes from the on state to the off state, the voltage of the data signal is held in the second capacitive element 233.

During a read-out period in which the reset signal and the data signal are read out from the signal holding circuit 230*k*, the second source follower circuit 240*k* reads out the reset signal from the first capacitive element 232 with the sample transistor 239 being in the off state. After that, when the sample transistor 239 changes from the off state to the on state, the second source follower circuit 240*k* reads out the data signal from the second capacitive element 233. During the read-out period, the signal generation circuit 250*k* supplies a ramp signal RAMP to each of the first capacitive element 232 and the second capacitive element 233. Accordingly, the pixel signal VSL on which the ramp signal RAMP is superimposed is input to the AD converter 130*j*. Since the ramp signal RAMP is superimposed on the pixel signal VSL, it is possible to increase the dynamic range of the pixel signal VSL.

Thirteenth Embodiment

FIG. 22 is a diagram illustrating a circuit configuration of a pixel 20*l* of an imaging device according to a thirteenth embodiment. Similar constituent elements to those in the first embodiment described above will be designated by the same reference signs and detailed descriptions thereof will be omitted. In the present embodiment, the pixel 20*l* includes a photoelectric conversion circuit 210*l*, a first source follower circuit 220*l*, a signal holding circuit 230*l*, a second source follower circuit 240*l*, and a signal generation circuit 250*l*. Note that FIG. 21 also illustrates an AD converter 130*l*, but the configuration of this AD converter 130*l* may be any one of the AD converters 130 to 130*b* described in the above embodiments.

The pixel 20*l* according to the present embodiment differs from the pixel 20*k* according to the twelfth embodiment illustrated in FIG. 21 in the configuration of the signal holding circuit 230*l*. In the signal holding circuit 230*k* according to the twelfth embodiment, the other ends of both the first capacitive element 232 and the second capacitive element 233 are connected to the signal generation circuit 250*k*. On the other hand, in the signal holding circuit 230*l* according to the present embodiment, only the other end of the first capacitive element 232 is connected to the signal generation circuit 250*l*, and the other end of the second capacitive element 233 is grounded.

In the pixel 20*l* configured as described above, as in the twelfth embodiment, during a GS period in which all pixels 20*l* are exposed, the reset signal is held in the first capacitive element 232 with the sample transistor 239 being in the on state, and the data signal is held in the second capacitive element 233 with the sample transistor 239 being in the off state.

Similarly to the twelfth embodiment, during a read-out period in which the reset signal and the data signal are read out from the signal holding circuit 230*l*, the second source follower circuit 240*l* reads out the reset signal with the sample transistor 239 being in the off state, and then reads out the data signal with the sample transistor 239 being in the on state. In the present embodiment, when the second source follower circuit 240*l* reads out the data signal, the ramp signal RAMP is output from the signal generation circuit 250*l* through the first capacitive element 232. Thus, by adjusting the timing of outputting the ramp signal RAMP from the signal generation circuit 250*l*, the ramp signal RAMP can be superimposed on the data signal. Consequently, it is possible to increase the dynamic range of the pixel signal VSL.

Fourteenth Embodiment

FIG. 23 is a diagram illustrating a circuit configuration of a pixel 20*m* of an imaging device according to a fourteenth embodiment. Similar constituent elements to those in the first embodiment described above will be designated by the same reference signs and detailed descriptions thereof will be omitted. In the present embodiment, the pixel 20*m* includes a photoelectric conversion circuit 210*m*, a first source follower circuit 220*m*, a signal holding circuit 230*m*, a second source follower circuit 240*m*, a signal generation circuit 250*m*, and a switching transistor 280. Note that FIG. 21 also illustrates an AD converter 130*m*, but the configuration of this AD converter 130*m* may be any one of the AD converters 130 to 130*b* described in the above embodiments.

In the pixel 20*m* according to the present embodiment, the circuit configuration except for the signal holding circuit 230*l* and the switching transistor 280 is the same as that in the first embodiment, thus, the description thereof will be omitted, and the signal holding circuit 230*l* and the switching transistor 280 will be described below.

The signal holding circuit 230*m* according to the present embodiment includes a first capacitive element 232, a second capacitive element 233, a second reset transistor 236, and a sample transistor 239. The first capacitive element 232 is an element for clamping (fixing) the voltage level of the signal amplified by the first amplifier transistor 221, and one end thereof is connected to the input node V1, and the other end is connected to the sample transistor 239. The second capacitive element 233 is an element for holding and accumulating the analog signal sampled and held by the sample transistor 239, one end thereof is connected to the output node V2, and the other end is connected to the signal generation circuit 250*m*.

The sample transistor 239 is a transistor for sampling and holding the voltage level at the other end of the first capacitive element 232 and storing the voltage level in the second capacitive element 233, and is configured by, for example, an N-channel MOS transistor. A sample and hold signal $\Phi 3$ is input to the gate of the sample transistor 239 from the row selection unit 12 via the corresponding pixel control line 31. The drain of the sample transistor 239 is connected to the other end of the first capacitive element 232, and the source thereof is connected to the output node V2.

The second reset transistor 236 is a transistor for resetting the second capacitive element 233. The operation of the second reset transistor 236 is controlled by a second reset signal RST2 from the row selection unit 12. Resetting the second capacitive element 233 is the control of the amount of charges stored in the second capacitive element 233 to set the potential of the second capacitive element 233 to a reference potential.

In the pixel 20*m* configured as described above, the voltages of the reset signal and the data signal are held in the second capacitive element 233 at different timings during a GS period in which all pixels 20*l* are exposed.

During a read-out period in which the reset signal and the data signal are read out from the signal holding circuit 230*l* at different timings, the signal generation circuit 250 supplies a ramp signal RAMP to the second capacitive element 233. Thus, the ramp signal RAMP is superimposed on each of the reset signal and the data signal. Thus, it is possible to increase the dynamic range of the pixel signal VSL.

Fifteenth Embodiment

FIG. 24 is a block diagram illustrating a configuration example of an electronic apparatus according to a fifteenth embodiment.

As illustrated in FIG. 24, an electronic apparatus 100 according to the present example includes an imaging optical system 101 including lenses, an imaging unit 102, a digital signal processor (DSP) circuit 103, a frame memory 104, a display device 105, a recording device 106, an operation system 107, and a power supply system 108. The DSP circuit 103, the frame memory 104, the display device 105, the recording device 106, the operation system 107, and the power supply system 108 are connected to one another via a bus line 109.

The imaging optical system 101 captures incident light (image light) from a subject and forms an image on an image forming surface of the imaging unit 102. The imaging unit 102 converts an amount of incident light, which forms an image on the imaging surface by the optical system 101, into an electrical signal for each pixel and outputs the electrical signal as a pixel signal. The DSP circuit 103 performs typical camera signal processing, for example, white balance processing, demosaicing, or gamma correction.

The frame memory 104 is used to store data as appropriate in the process of signal processing in the DSP circuit 103. The display device 105 is configured by a panel display device such as a liquid crystal display device or an organic electro luminescence (EL) display device, and displays a moving image or a still image captured by the imaging unit 102. The recording device 106 records a moving image or a still image captured by the imaging unit 102 on a recording medium such as a portable semiconductor memory, an optical disk, or a hard disk drive (HDD).

The operation system 107 issues operation commands for various functions of the imaging unit 102 in response to a user operation. The power supply system 108 supplies, as appropriate, various power supplies serving as operation power supplies for the DSP circuit 103, the frame memory 104, the display device 105, the recording device 106, and the operation system 107 to these supply targets.

In the electronic apparatus 100 configured as described above, the imaging device according to the above-described embodiments may be used as the imaging unit 102. With that imaging device, it is possible to increase the dynamic range of the imaging unit 102, so that it is possible to improve the image quality.

<Application to Moving Body>

The technology of the present disclosure (the present technology) can be applied to various products. For example, the technology according to the present disclosure may be realized as a device mounted on any type of moving body such as an automobile, an electric automobile, a hybrid electric automobile, a motorcycle, a bicycle, a personal mobility device, an airplane, a drone, a ship, a robot, or the like.

FIG. 25 is a block diagram illustrating an example of a schematic configuration of a vehicle control system which is an example of a moving body control system to which the technology of the present disclosure can be applied.

A vehicle control system 12000 includes a plurality of electronic control units connected via a communication network 12001. In the example illustrated in FIG. 25, the vehicle control system 12000 includes a drive system control unit 12010, a body system control unit 12020, a vehicle exterior information detection unit 12030, a vehicle interior information detection unit 12040, and an integrated control unit 12050. In addition, as the functional configuration of the integrated control unit 12050, a microcomputer 12051, an audio and image output unit 12052, and an in-vehicle network interface (I/F) 12053 are illustrated.

The drive system control unit 12010 controls operations of devices related to a drive system of a vehicle in accordance with various programs. For example, the drive system control unit 12010 functions as a control device for a driving force generation device that generates a vehicle driving force of an internal combustion engine, a driving motor, or the like, a driving force transmission mechanism that transmits a driving force to wheels, a steering mechanism that adjusts a steering angle of a vehicle, and a braking device that generates a braking force of the vehicle.

The body system control unit 12020 controls operations of various devices mounted in the vehicle body in accordance with various programs. For example, the body system control unit 12020 functions as a control device for a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The vehicle exterior information detection unit 12030 detects information on the outside of the vehicle having the vehicle control system 12000 mounted thereon. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for people, cars, obstacles, signs, and letters on the road on the basis of the received image.

The imaging unit 12031 is an optical sensor that receives light and outputs an electrical signal according to the amount of light received. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate control target values for the driving force generation device, the steering mechanism, or the braking device on the basis of information on the inside and outside of the vehicle, the information being acquired by the vehicle exterior information detection unit 12030 or the vehicle interior information detection unit 12040, and the microcomputer 12051 can output control commands to the drive system control unit 12010. For example, the microcomputer 12051 can perform cooperative control for the purpose of implementing the functions of an advanced driver assistance system (ADAS) including vehicle collision avoidance, impact mitigation, following traveling based on an inter-vehicle distance, vehicle speed maintenance driving, vehicle collision warning, and vehicle lane deviation warning.

Further, the microcomputer 12051 can perform cooperative control for the purpose of automated driving or the like in which autonomous travel is performed without depending on operations of the driver, by controlling the driving force generation device, the steering mechanism, or the braking device and the like on the basis of information about the surroundings of the vehicle, the information being acquired by the vehicle exterior information detection unit 12030 or the vehicle interior information detection unit 12040.

In addition, the microcomputer 12051 can output a control command to the body system control unit 12030 on the basis of the information on the outside of the vehicle, the information being acquired by the vehicle exterior information detection unit 12030. For example, the microcomputer 12051 can perform coordinated control for the purpose of antiglare such as switching a high beam to a low beam by controlling a headlamp according to a position of a preceding vehicle or an oncoming vehicle detected by the vehicle exterior information detection unit 12030.

The audio and image output unit 12052 transmits an output signal of at least one of audio and an image to an output device capable of visually or audibly notifying an occupant of the vehicle or the outside of the vehicle of information. In the example of FIG. 25, an audio speaker 12061, a display unit 12062, and an instrument panel 12063 are exemplified as output devices. The display unit 12062 may include, for example, at least one of an onboard display and a head-up display.

FIG. 26 is a diagram illustrating an example of positions at which the imaging unit 12031 is installed.

In FIG. 26, imaging units 12101, 12102, 12103, 12104, and 12105 are included as the imaging unit 12031.

The imaging units 12101, 12102, 12103, 12104, and 12105 are provided at, for example, the positions of a front nose, side mirrors, a rear bumper, a back door, an internal upper portion of the front windshield of the vehicle 12100. The imaging unit 12101 provided at the front nose and the imaging unit 12105 provided at the internal upper portion of the front windshield mainly acquire images ahead of the vehicle 12100. The imaging units 12102 and 12103 provided in the side mirrors mainly acquire images on lateral sides of the vehicle 12100. The imaging unit 12104 included in the rear bumper or the back door mainly acquires an image of an area behind the vehicle 12100. The imaging unit 12105 included in the upper portion of the windshield inside of the vehicle is mainly used for detection of a preceding vehicle, a pedestrian, an obstacle, a traffic signal, a traffic sign, a lane, or the like.

FIG. 26 illustrates an example of imaging ranges of the imaging units 12101 to 12104. An imaging range 12111 indicates the imaging range of the imaging unit 12101 provided at the front nose, an imaging range 1211212113 indicating the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing pieces of image data captured by the imaging units 12101 to 12104.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path along which the vehicle 12100 is traveling, which is a three-dimensional object traveling at a predetermined speed (for example, 0 km/h or higher) in the substantially same direction as the vehicle 12100, as a preceding vehicle by acquiring a distance to each of three-dimensional objects in the imaging ranges 12111 to 12114 and temporal change in the distance (a relative speed with respect to the vehicle 12100) on the basis of the distance information obtained from the imaging units 12101 to 12104. Further, the microcomputer 12051 can set an inter-vehicle distance which should be secured in front of the vehicle in advance with respect to the preceding vehicle and can perform automated brake control (also including following stop control) or automated acceleration control (also including following start control). Thus, it is possible to perform cooperative control for the purpose of, for example, automated driving in which the vehicle travels in an automated manner without requiring the driver to perform operations.

For example, the microcomputer 12051 can classify three-dimensional object data relating to three-dimensional objects into that of a two-wheeled vehicle, an ordinary vehicle, a large vehicle, a pedestrian, an electric pole, and other three-dimensional objects and extract those three-dimensional objects based on the distance information obtained from the imaging units 12101 to 12104 and use the extracted three-dimensional objects for automatic avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging units 12101 to 12104 and the pedestrian is recognized, the audio and image output unit 12052 controls the display unit 12062 so that a square contour line for emphasis is superimposed and displayed with the recognized pedestrian. In addition, the audio and image output unit 12052 may control the display unit 12062 so that an icon indicating a pedestrian or the like is displayed at a desired position.

An example of the vehicle control system to which the technology according to the present disclosure can be applied has been described above. The technology according to the present disclosure is applicable to, for example, the imaging unit 12031 among the configurations described above. Specifically, the imaging device 1 can be applied to the imaging unit 12031. By applying the technology according to the present disclosure, a higher quality captured image can be obtained and thus the safety can be improved.

The present technology can have the following configurations.

(1) An imaging device, including:

a plurality of pixels that are exposed during a same period; and an AD converter that digitizes an analog pixel signal output from each of the plurality of pixels, wherein each of the plurality of pixels includes a photoelectric conversion circuit that photoelectrically converts incident light, a first source follower circuit that amplifies an output signal of the photoelectric conversion circuit, a signal holding circuit that holds an output signal of the first source follower circuit, and a second source follower circuit that amplifies a signal read out from the signal holding circuit and outputs the signal as the pixel signal, and a ramp signal including a slope portion in which a voltage level changes like a ramp is supplied to the signal holding circuit.

(2) The imaging device according to (1), further including a signal generation circuit that generates the ramp signal and supplies the ramp signal to the signal holding circuit.

(3) The imaging device according to (1) or (2), wherein the signal holding circuit includes a first capacitive element that holds a first signal that has reset the photoelectric conversion circuit, and a second capacitive element that holds a second signal generated by photoelectric conversion of the photoelectric conversion circuit, and the signal generation circuit supplies the ramp signal to each of the first capacitive element and the second capacitive element.

(4) The imaging device according to (3), wherein the signal holding circuit further includes a first sample transistor that is connected in series to the first capacitive element, and a second sample transistor that is connected in series to the second capacitive element, and when the first sample transistor is in an on state, the first signal is held in the first capacitive element, and when the second sample transistor is in an on state at a timing different from that of the first sample transistor, the second signal is held in the second capacitive element.

(5) The imaging device according to (3) or (4), wherein the second source follower circuit reads out the first signal from the signal holding circuit before reading out the second signal.

(6) The imaging device according to (3) or (4), wherein the second source follower circuit reads out the second signal from the signal holding circuit before reading out the first signal.

(7) The imaging device according to any one of (3) to (6), wherein the signal holding circuit further includes a switch that is disposed between the signal generation circuit and an input node to which one end of the first capacitive element and one end of the second capacitive element are commonly connected, and the switch is in an on state during a period in which the second source follower circuit reads out a signal held in the signal holding circuit.

(8) The imaging device according to any one of (1) to (7), further including a current source that is shared by the second source follower circuit and the AD converter.

(9) The imaging device according to (7), wherein the signal holding circuit further includes a reset transistor that resets a potential of the input node.

(10) The imaging device according to any one of (1) to (8), wherein the first source follower circuit includes an amplifier transistor that amplifies the output signal of the photoelectric conversion circuit, a selection transistor that is connected in series to the amplifier transistor, a bias cut switch that is connected in series to the selection transistor, and a current source that is connected in series to the bias cut switch, and the bias cut switch is in an off state from an end of a period in which the plurality of pixels are exposed to just before a start of a period in which the second source follower circuit reads out a signal held in the signal holding circuit.

(11) The imaging device according to (10), wherein the bias cut switch is in the off state also during a period in which the second source follower circuit reads out the signal held in the signal holding circuit.

(12) The imaging device according to (10) or (11), wherein the first source follower circuit further includes a switch that is disposed between the selection transistor and the signal holding circuit, and the switch is controlled independently from the selection transistor.

(13) The imaging device according to any one of (1) to (8), further including a third source follower circuit that amplifies the ramp signal and supplies the resulting ramp signal to the signal holding circuit.

(14) The imaging device according to (13), wherein the third source follower circuit includes an amplifier transistor that amplifies the ramp signal, and a selection transistor that is disposed between the amplifier transistor and the signal holding circuit, and the selection transistor is in an on state during a period in which the second source follower circuit reads out a signal held in the signal holding circuit.

(15) The imaging device according to any one of (1) to (14), wherein the ramp signal includes the slope portion and an offset portion in which the voltage level changes like a rectangular wave.

(16) The imaging device according to (15), wherein the slope portion is supplied to the signal holding circuit, and the offset portion is supplied to the AD converter.

(17) The imaging device according to (16), wherein the AD converter includes an input transistor and an output transistor that is provided at a stage subsequent to the input transistor, the offset portion is input to a gate of the input transistor, the pixel signal is input to a source of the input transistor, and a drain of the input transistor is connected to a gate of the output transistor, and the pixel signal is input to a source of the output transistor.

(18) The imaging device according to (7), wherein the photoelectric conversion circuit, the first source follower circuit, and the switch are arranged on a first substrate, and remaining elements of the signal holding circuit other than the switch, and the second source follower circuit are arranged on a second substrate stacked on the first substrate.

(19) The imaging device according to (7), wherein some elements of the photoelectric conversion circuit are arranged on a first substrate, remaining elements of the photoelectric conversion circuit, the first source follower circuit, and the switch are arranged on a second substrate stacked on the first substrate, and remaining elements of the signal holding circuit other than the switch, and the second source follower circuit are arranged on a third substrate stacked on the first substrate and the second substrate.

(20) An electronic apparatus including an imaging device that includes: a plurality of pixels that are exposed during a same period; and an AD converter that digitizes an analog pixel signal output from each of the plurality of pixels, wherein each of the plurality of pixels includes a photoelectric conversion circuit that photoelectrically converts incident light, a first source follower circuit that amplifies an output signal of the photoelectric conversion circuit, a signal holding circuit that holds an output signal of the first source follower circuit, and a second source follower circuit that amplifies a signal read out from the signal holding circuit and outputs the signal as the pixel signal, and a ramp signal including a slope portion in which a voltage level changes like a ramp is supplied to the signal holding circuit.

REFERENCE SIGNS LIST

1 Imaging device
20 to 20m Pixel

100 Electronic apparatus
130 to 130m AD converter
133b Input transistor
134b Output transistor
210 to 210m Photoelectric conversion circuit
220 to 220m First source follower circuit
221 First amplifier transistor
222 First switch
223 First current source
224 First selection transistor
225 Bias cut switch
230 to 230m Signal holding circuit
231 Second switch
232 First capacitive element
233 Second capacitive element
234 First sample transistor
235 Second sample transistor
238 Third reset transistor
240 to 240m Second source follower circuit
243 Second current source
250 to 250m Signal generation circuit
260 Third source follower circuit
261 Amplifier transistor
262 Third selection transistor
301 First substrate
302 Second substrate
303 Third substrate

The invention claimed is:

1. An imaging device comprising:
a plurality of pixels that are exposed during a same period;
an AD converter that digitizes a pixel signal that is output from each of the plurality of pixels,
wherein each of the plurality of pixels includes
a photoelectric conversion circuit that photoelectrically converts incident light,
a first source follower circuit that amplifies an output signal of the photoelectric conversion circuit,
a signal holding circuit that holds an output signal of the first source follower circuit, and
a second source follower circuit that amplifies a signal read out from the signal holding circuit and outputs the signal as the pixel signal; and
a signal generation circuit that generates a ramp signal including a slope portion in which a voltage level changes like a ramp, and that supplies the ramp signal to the signal holding circuit, wherein
the signal holding circuit includes a first capacitive element that holds a first signal that has reset the photoelectric conversion circuit, and a second capacitive element that holds a second signal generated by photoelectric conversion of the photoelectric conversion circuit, the first capacitive element and the second capacitive element being connected in parallel between an output of the first source follower circuit and an input of the second source follower circuit.

2. The imaging device according to claim 1, wherein the signal generation circuit supplies the ramp signal to each of the first capacitive element and the second capacitive element.

3. The imaging device according to claim 2, wherein the signal holding circuit further includes a first sample transistor that is connected in series to the first capacitive element, and a second sample transistor that is connected in series to the second capacitive element, and
when the first sample transistor is in an on state, the first signal is held in the first capacitive element, and when the second sample transistor is in an on state at a timing different from that of the first sample transistor, the second signal is held in the second capacitive element.

4. The imaging device according to claim 2, wherein the second source follower circuit reads out the first signal from the signal holding circuit before reading out the second signal.

5. The imaging device according to claim 2, wherein the second source follower circuit reads out the second signal from the signal holding circuit before reading out the first signal.

6. The imaging device according to claim 2, wherein
the signal holding circuit further includes a switch that is disposed between the signal generation circuit and an input node to which one end of the first capacitive element and one end of the second capacitive element are commonly connected, and
the switch is in an on state during a period in which the second source follower circuit reads out a signal held in the signal holding circuit.

7. The imaging device according to claim 6, wherein the signal holding circuit further includes a reset transistor that resets a potential of the input node.

8. The imaging device according to claim 6, wherein
the photoelectric conversion circuit, the first source follower circuit, and the switch are arranged on a first substrate, and
remaining elements of the signal holding circuit other than the switch, and the second source follower circuit are arranged on a second substrate stacked on the first substrate.

9. The imaging device according to claim 6, wherein
some elements of the photoelectric conversion circuit are arranged on a first substrate,
remaining elements of the photoelectric conversion circuit, the first source follower circuit, and the switch are arranged on a second substrate stacked on the first substrate, and
remaining elements of the signal holding circuit other than the switch, and the second source follower circuit are arranged on a third substrate stacked on the first substrate and the second substrate.

10. The imaging device according to claim 1, further comprising a current source that is shared by the second source follower circuit and the AD converter.

11. The imaging device according to claim 1, wherein
the first source follower circuit includes an amplifier transistor that amplifies the output signal of the photoelectric conversion circuit, a selection transistor that is connected in series to the amplifier transistor, a bias cut switch that is connected in series to the selection transistor, and a current source that is connected in series to the bias cut switch, and
the bias cut switch is in an off state from an end of a period in which the plurality of pixels are exposed to just before a start of a period in which the second source follower circuit reads out a signal held in the signal holding circuit.

12. The imaging device according to claim 11, wherein the bias cut switch is in the off state also during a period in which the second source follower circuit reads out the signal held in the signal holding circuit.

13. The imaging device according to claim 11, wherein
the first source follower circuit further includes a switch that is disposed between the selection transistor and the signal holding circuit, and the switch is controlled independently from the selection transistor.

14. The imaging device according to claim 1, further comprising a third source follower circuit that amplifies the ramp signal to produce an amplified ramp signal and that supplies the amplified ramp signal to the signal holding circuit.

15. The imaging device according to claim 14, wherein the third source follower circuit includes an amplifier transistor that amplifies the ramp signal, and a selection transistor that is disposed between the amplifier transistor and the signal holding circuit, and the selection transistor is in an on state during a period in which the second source follower circuit reads out a signal held in the signal holding circuit.

16. An imaging device comprising:

a plurality of pixels that are exposed during a same period;

an AD converter that digitizes a pixel signal that is output from each of the plurality of pixels, wherein each of the plurality of pixels includes a photoelectric conversion circuit that photoelectrically converts incident light, a first source follower circuit that amplifies an output signal of the photoelectric conversion circuit, a signal holding circuit that holds an output signal of the first source follower circuit, and a second source follower circuit that amplifies a signal read out from the signal holding circuit and outputs the signal as the pixel signal, and wherein a ramp signal including a slope portion in which a voltage level changes like a ramp is supplied to the signal holding circuit, and the ramp signal includes the slope portion and an offset portion in which the voltage level changes like a rectangular wave.

17. The imaging device according to claim 16, wherein the slope portion is supplied to the signal holding circuit, and the offset portion is supplied to the AD converter.

18. The imaging device according to claim 17, wherein the AD converter includes an input transistor and an output transistor that is provided at a stage subsequent to the input transistor, the offset portion is input to a gate of the input transistor, the pixel signal is input to a source of the input transistor, and a drain of the input transistor is connected to a gate of the output transistor, and the pixel signal is input to a source of the output transistor.

19. An electronic apparatus comprising:

an imaging device that includes:

a plurality of pixels that are exposed during a same period;

an AD converter that digitizes a pixel signal that is output from each of the plurality of pixels, wherein each of the plurality of pixels includes a photoelectric conversion circuit that photoelectrically converts incident light, a first source follower circuit that amplifies an output signal of the photoelectric conversion circuit, a signal holding circuit that holds an output signal of the first source follower circuit, and a second source follower circuit that amplifies a signal read out from the signal holding circuit and outputs the signal as the pixel signal; and a signal generation circuit that generates a ramp signal including a slope portion in which a voltage level changes like a ramp, and that supplies the ramp signal to the signal holding circuit, wherein the signal holding circuit includes a first capacitive element that holds a first signal that has reset the photoelectric conversion circuit, and a second capacitive element that holds a second signal generated by photoelectric conversion of the photoelectric conversion circuit, the first capacitive element and the second capacitive element being connected in parallel between an output of the first source follower circuit and an input of the second source follower circuit.

* * * * *